US012681310B2

(12) United States Patent
Becker et al.

(10) Patent No.: US 12,681,310 B2
(45) Date of Patent: Jul. 14, 2026

(54) ACTIVE DIMMING CONTROL USING DISPARITY CAMERA IMAGES

(71) Applicant: Meta Platforms Technologies, LLC, Menlo Park, CA (US)

(72) Inventors: Gabor Szedo Becker, Sammamish, WA (US); John Nelson, Redmond, WA (US); Afsoon Jamali, Issaquah, WA (US)

( * ) Notice: Subject to any disclaimer, the term of this patent is extended or adjusted under 35 U.S.C. 154(b) by 0 days.

(21) Appl. No.: 18/990,580

(22) Filed: Dec. 20, 2024

(65) Prior Publication Data

US 2026/0177825 A1 Jun. 25, 2026

(51) Int. Cl.
*G02B 27/01* (2006.01)
*G06V 10/60* (2022.01)

(52) U.S. Cl.
CPC ......... *G02B 27/0172* (2013.01); *G06V 10/60* (2022.01); *G02B 2027/0174* (2013.01)

(58) Field of Classification Search
None
See application file for complete search history.

(56) References Cited

U.S. PATENT DOCUMENTS

| | | |
|---|---|---|
| 10,867,451 B2 | 12/2020 | Sears et al. |
| 11,169,380 B2 | 11/2021 | Manly et al. |
| 11,202,043 B1 | 12/2021 | Elazhary et al. |
| 11,256,093 B2 | 2/2022 | Curtis et al. |
| 2017/0131551 A1* | 5/2017 | Robbins .............. G02F 1/13439 |
| 2018/0011322 A1* | 1/2018 | Leighton ................ G02B 27/10 |
| 2018/0338122 A1* | 11/2018 | Travis .................. G02B 5/1828 |
| 2021/0048676 A1* | 2/2021 | Manly ................ G02B 27/0018 |
| 2025/0164813 A1* | 5/2025 | Cincione ........... G02B 27/0179 |

OTHER PUBLICATIONS

Kress B.C., et al., "Optical Architecture of HoloLens Mixed Reality Headset," Proceedings of SPIE Digital Optical Technologies, Jun. 26, 2017, vol. 10335, 10 pages.

* cited by examiner

*Primary Examiner* — Nicholas J Lee
(74) *Attorney, Agent, or Firm* — Greenberg Traurig, LLP

(57) ABSTRACT

A waveguide display includes a waveguide, a projector configured to project images (e.g., images to be displayed to a user and/or disparity test images) onto the waveguide, an input coupler configured to couple the images into the waveguide, and one or more output couplers on the waveguide. At least one output coupler of the one or more output couplers is configured to direct the projected images towards the user's eye. At least one output coupler of the one or more output couplers is configured to direct the projected images towards a disparity camera. The waveguide display includes an active dimming layer on the side of the waveguide opposing the user's eye. The active dimming layer is electrically controllable to attenuate ambient light reaching the users eye via the waveguide, based on the effect of the ambient light on the visibility of the projected images measured using the disparity camera.

20 Claims, 13 Drawing Sheets

1200

1210

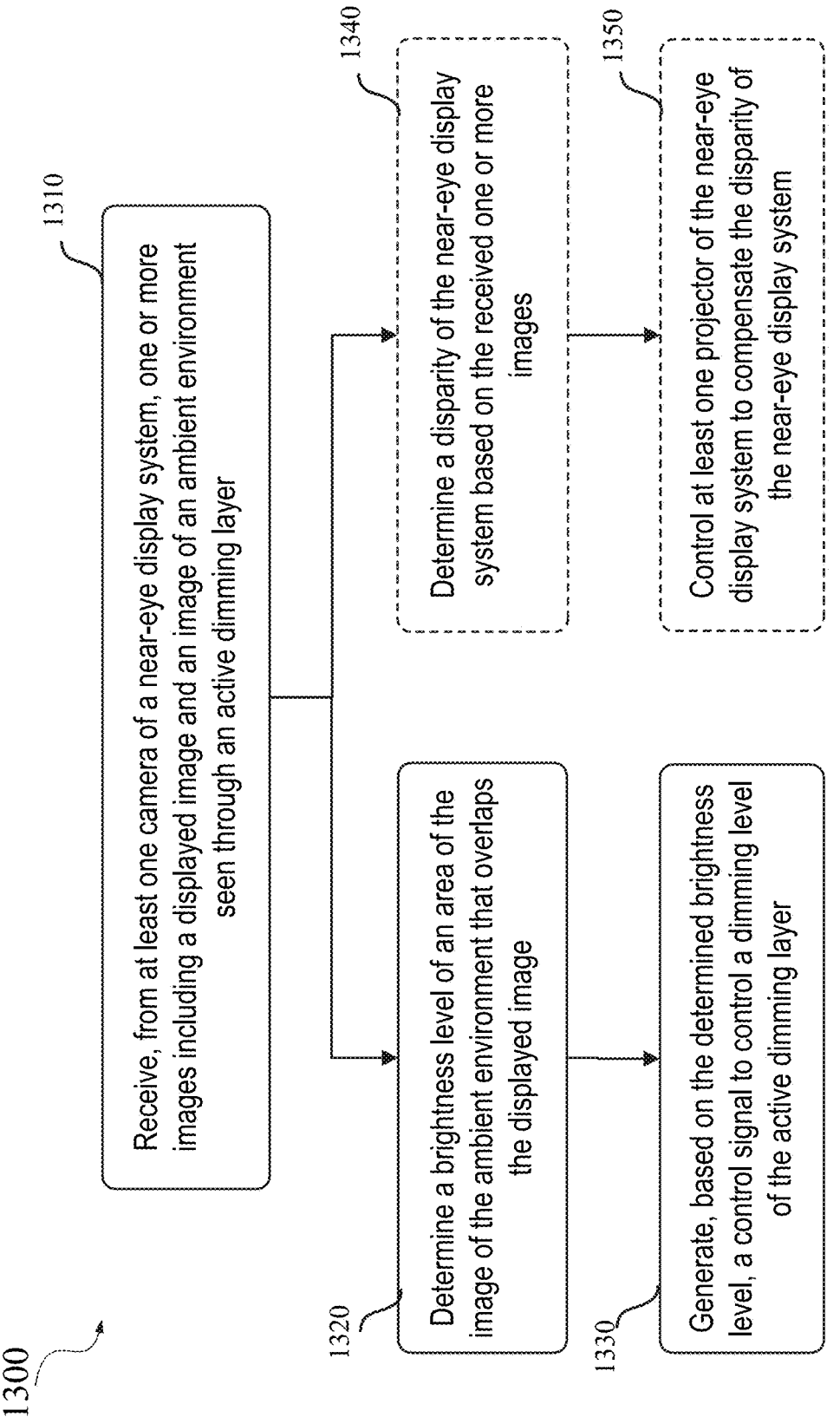

1300

1310

Receive, from at least one camera of a near-eye display system, one or more images including a displayed image and an image of an ambient environment seen through an active dimming layer

1320

Determine a brightness level of an area of the ambient environment that overlaps the displayed image

1330

Generate, based on the determined brightness level, a control signal to control a dimming level of the active dimming layer

1340

Determine a disparity of the near-eye display system based on the received one or more images

1350

Control at least one projector of the near-eye display system to compensate the disparity of the near-eye display system

FIG. 13

ACTIVE DIMMING CONTROL USING DISPARITY CAMERA IMAGES

BACKGROUND

An extended reality (XR) system, such as a head-mounted display (HMD) or heads-up display (HUD) system, generally includes a near-eye display (e.g., in the form of a headset or a pair of glasses) that presents content to a user via an electronic or optic display within, for example, about 12-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)), and the surrounding environment by, for example, seeing through transparent display glasses or lenses (often referred to as optical see-through).

One example of an optical see-through AR system may include a waveguide-based optical display, where light of projected images may be coupled into a waveguide (e.g., a transparent substrate), propagate within the waveguide, and be coupled out of the waveguide at multiple locations. In some implementations, the light of the projected images may be coupled into or out of the waveguide using transflective mirrors or diffractive optical elements, such as surface-relief gratings or volume Bragg gratings. Light from the surrounding environment may pass through a see-through region of the waveguide and reach the user's eyes as well.

SUMMARY

This disclosure relates generally to near-eye display systems. More specifically, techniques disclosed herein relate to optical see-through near-eye display systems including active dimming layers that are controlled based on images captured by a disparity camera. Various inventive embodiments are described herein, including devices, components, systems, modules, subsystems, methods, and the like.

According to certain embodiments, a near-eye display system may include a projector configured to generate a displayed image, a waveguide display including a waveguide and configured to replicate the displayed image, an active dimming layer on a side of the waveguide opposing an eye of a user of the near-eye display system, a camera configured to receive both the replicated image of the displayed image and an image of an ambient environment see through the active dimming layer and the waveguide; and a controller configured to control the projector and the active dimming layer based on the replicated image of the displayed image and the image of the ambient environment from the camera. The waveguide display may include an output coupler configured to couple a replicated image of the displayed image out of a peripheral region of the waveguide. The active dimming layer may be configurable to attenuate ambient light in response to a control signal.

According to certain embodiments, a near-eye display system may include a first waveguide display subsystem that includes a first projector configured to generate a first displayed image, a first waveguide display including a first waveguide and configured to replicate the first displayed image, and a first active dimming layer on a side of the first waveguide opposing a first eye of a user of the near-eye display system. The first waveguide display may include a first output coupler configured to couple a replicated image of the first displayed image out of a peripheral region of the first waveguide. The first active dimming layer may be configurable to variably attenuate ambient light. The near-eye display system may also include a second waveguide display subsystem that includes a second projector configured to generate a second displayed image, a second waveguide display including a second waveguide and configured to replicate the second displayed image, and a second active dimming layer on a side of the second waveguide opposing a second eye of the user of the near-eye display system. The second waveguide display including a second output coupler configured to couple a replicated image of the second displayed image out of a peripheral region of the second waveguide. The second active dimming layer may be configurable to variably attenuate the ambient light. The near-eye display system may further include a camera configured to receive at least the replicated image of the first displayed image and an image of an ambient environment see through the first active dimming layer and the first waveguide, and a controller configured to control at least the first projector and the first active dimming layer based on the replicated image of the first displayed image and the image of the ambient environment.

According to certain aspects, a method may include, by a controller of a near-eye display system: receiving, from at least one disparity camera of the near-eye display system, one or more images including a displayed image and an image of an ambient environment seen through an active dimming layer; determining a brightness level of an area of the image of ambient environment that overlaps the displayed image; and generating, based on the determined brightness level, a control signal to control a dimming level of the active dimming layer.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 13 includes a flowchart illustrating an example of a method of dynamically controlling active dimming layers of a near-eye display system according to certain embodiments.

Figure 1:
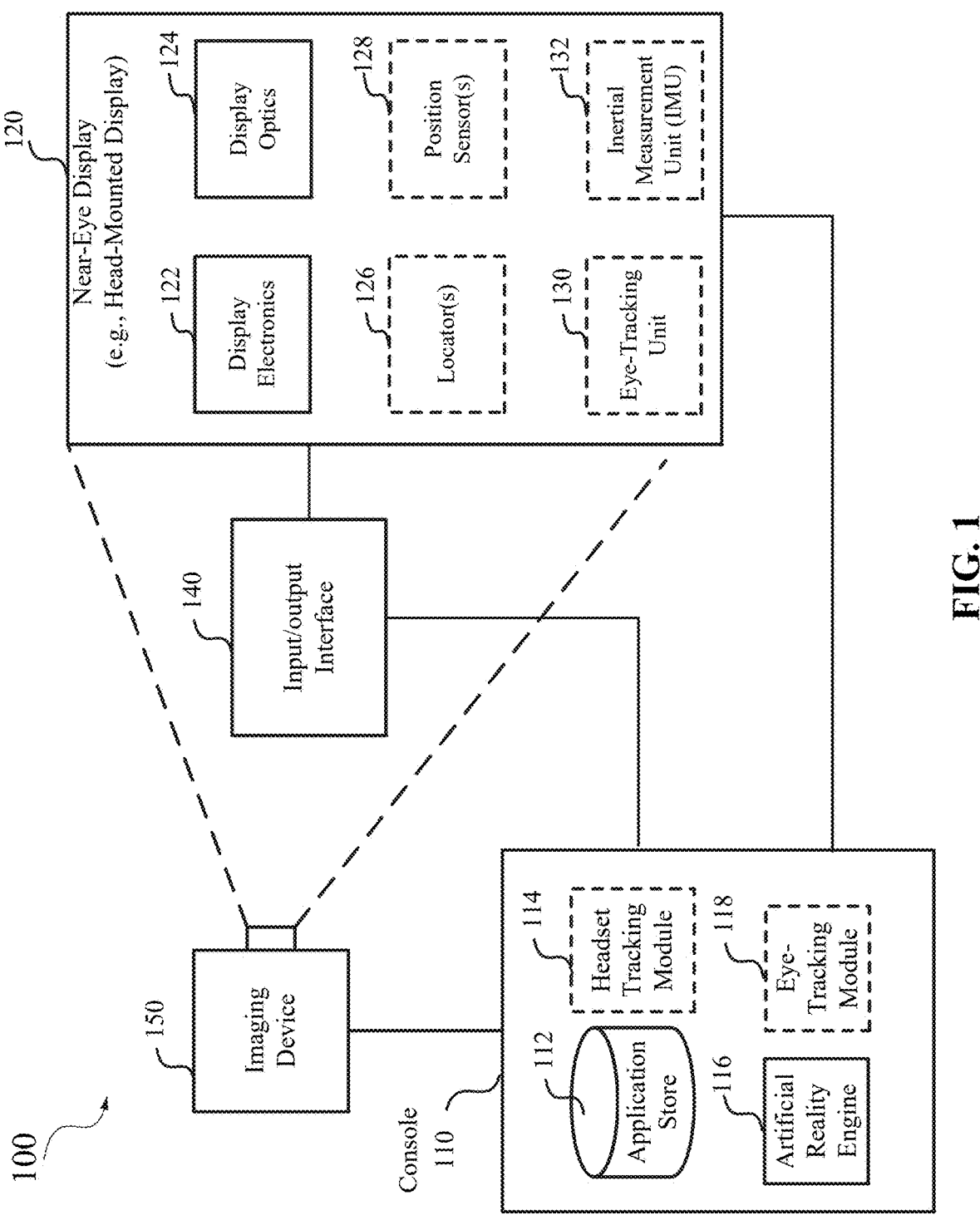
FIG. 1 is a simplified block diagram of an example of an extended reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to near-eye display systems. More specifically, techniques disclosed herein relates to optical see-through near-eye display systems including active dimming layers that are controlled based on images captured by a disparity camera. Various inventive embodiments are described herein, including devices, components, systems, modules, subsystems, methods, and the like.

Augmented reality (AR), virtual reality (VR), mixed reality (MR), and other extended reality applications may use near-eye display systems to present images of virtual objects and/or real objects to the user's eyes. A near-eye display system generally includes an image source (e.g., a display panel) that is near the user's eyes and can generate images to be viewed by the user. The near-eye display system may also include display optics configured to project the images generated by the image source to create virtual images that appear to be away from the image source and further than just a few centimeters away from the user's eyes. The image source of the near-eye display system may include, for example, a liquid crystal display (LCD), an organic light emitting diode (OLED) display, a micro-OLED display, an inorganic light emitting diode (ILED) display, a micro light emitting diode (micro-LED) display, an active-matrix OLED display (AMOLED), a transparent OLED display (TOLED), and the like. The display optics of the near-eye display system may include, for example, a lens (e.g., pancake lens) and/or an optical combiner such as a waveguide combiner, a partial reflector combiner, a prism birdbath combiner, a free-space birdbath combiner, and the like.

For example, in some near-eye display systems, waveguide displays may be used to present images to users. A waveguide display may include, for each eye of a user's eyes, a light source, a waveguide, and optical couplers formed on or in the waveguide. The light source may include one or more projectors for projecting two-dimensional color images, and may be placed at a peripheral region of the waveguide display such that it may not block the field of view of the user's eyes. The optical couplers may include one or more input couplers configured to couple display light into the waveguide such that the display light may propagate within the waveguide through total internal reflection. The waveguide may be transparent to visible light, and may guide the display light to propagate within the waveguide and also allow ambient light to pass through. The optical couplers may also include one or more output couplers configured to couple the display light out of the waveguide at multiple locations such that the display light may be directed towards an eyebox of the near-eye display system to fill the eyebox.

It is generally desirable that the near-eye display system has a small size, low weight, a large field of view, a large eyebox, high power efficiency, high brightness, high resolution, high refresh rate, low cost, long battery life, and a long lifetime. It can be challenging to achieve these characteristics in a near-eye display system. For example, a near-eye display system is generally worn on a user's head (referred to as a head-mounted display), and thus the weight constraint may be much more restrictive than other battery-powered portable electronic devices, such as cell phones, tablets or laptop computers. Therefore, a near-eye display system may be constrained in the amount of power that can be used by the display device, and it is desirable that the near-eye display system has low power consumption to improve battery life and/or reduce the weight of the near-eye display system. However, the illumination source of the near-eye display system may have limited power efficiency, and the display optics may also have limited optical efficiency due to, for example, limited coupling efficiencies of the optical couplers for coupling light from the image source into and out of a waveguide. Therefore, the display projector (e.g., a display panel) of a near-eye display system may often need to have high power consumption in order to provide bright, high-resolution, and high-refresh rate images with a large color gamut and a large field of view (FOV) to improve the immersive experience of using the head-mounted display. It can be challenging to achieve high output image brightness but low power consumption in near-eye display systems.

Power consumption of a near-eye display system may depend on several factors, including the brightness and color gamut of the displayed images. Reducing the brightness of the displayed images may significantly reduce the power consumption of the display system. Therefore, one way to reduce the power consumption by the near-eye display system is to reduce the brightness of the pixels globally. Reducing the brightness of the pixels can also increase their lifetime (e.g., reducing pixel burnout), thereby increasing the overall lifespan of the near-eye display system. However, reducing the overall brightness of the pixels may negatively impact the user experience from a contrast ratio and image quality perspective. In particular, when a near-eye display system is used outdoors under the sunlight, the brightness of the displayed images may need to be sufficiently high compared to the bright sunlight in the ambient environment such that the displayed images can be viewed by the user with the bright ambient environment in the background. In some near-eye display systems, the display projector may not be able to provide the desired high output power and brightness for outdoor use, due to the limited maximum output power of the illumination source. Even if the display projector can provide the desired high output power, the near-eye display system may be unsafe for user's eyes, in particular, when the pupil of the user's eye is dilated. In addition, the power efficiency and the battery life of the near-eye display systems may be low.

In some near-eye display systems, an active dimming layer may be used to dim ambient light, such that the brightness of the images displayed by the image source can also be reduced to reduce the power consumption, while the relative brightness (e.g., the contrast) between the displayed images and the ambient light can still be sufficiently high for the user to comfortably view the displayed images in the presence of ambient light. The active dimming layer may need to be dimmed based on the brightness of the ambient environment, in order to achieve the desired contrast between the displayed images and the ambient environment to properly render augmented reality scenes. For example, when the ambient environment is brighter, the ambient light may be attenuated more by the active dimming layer. The active dimming layer may be on a side of the waveguide display opposing the user eyes (e.g., between the ambient environment and the waveguide display) such that the active dimming layer may dim the ambient light but may not dim the images displayed to the user's eye by the waveguide display.

In order to automatically and dynamically control the dimming of the active dimming layer, the near-eye display system may need to measure the brightness or intensity of the ambient light and adjust the transparency of the active dimming layer accordingly. Some near-eye display systems may use a forward-facing Simultaneous Localization And Mapping (SLAM) or Point-of-View (POV) cameras for ambient light measurement. But there may be multiple challenges associated with using ambient light measured by the forward-facing camera for adaptive dimming. For example, since the bright areas of the ambient environment that are behind the displayed image may affect the user's viewing of the displayed image the most, whereas the bright areas outside of the area of the displayed image may have little or no effect on the user's viewing of the displayed image, the images of the ambient environment captured by the forward-facing camera may need to be registered (e.g., mapped) into the display coordinate space or vice versa, in order to determine the bright areas of the ambient environment that are behind the displayed image and the appropriate amount of attenuation of the ambient light. In addition, collecting images with identifiable faces and locations raise privacy concerns. To indicate active front-facing cameras augmented reality devices may have privacy warning lights. Having the front-facing high resolution cameras active may not be socially acceptable in all situations where dimming is needed. Furthermore, the voltage level for controlling the active dimming layer to attenuate the ambient light by a certain amount (e.g., a certain percentage) may change over time due to, for example, aging and degradation caused by UV radiation. To better estimate and control the amount of ambient light that passes through the active dimming layer and reaches the waveguide display, it may be beneficial and desirable to measure the brightness of the ambient light passed through the active dimming layer.

In some near-eye display systems, misalignments (e.g., relative tip, tilt, and rotation) between the waveguide and the light source (e.g., including a display panel and the projector) or relative movement of an assembly that includes a waveguide and the light source for an eye with respect to another assembly for the other eye may cause the display images presented to the left eye and the right eye of the user to be different from the desired two-dimensional (2D) display images. The binocular display is intended to show objects with proper binocular disparity such that the user's brain can extract proper depth information from the two 2D images captured by the two eyes through stereopsis. Therefore, the user may see two images of a same object and other undesired optical artifacts, such as brightness and/or color mismatch or non-uniformity, which may also degrade the user experience of using the near-eye display system.

In some near-eye display systems, to reduce or otherwise mitigate the undesired optical artifacts caused by the misalignment or relative movement described above, and to facilitate dynamic uniformity correction and de-warping of the display, one or more disparity couplers (on one side or both sides of the waveguide) may be used on the nasal side of the waveguide for each eye to couple some light (e.g., light of a displayed image or a disparity test light pattern) from the light source out of the waveguide at the nasal side of the waveguide to monitor the displayed images. One or two disparity sensors may detect the light for disparity test from the two waveguides for two eyes, to determine alignment errors between the left image and the right image in the binocular near-eye display system. The display panel (e.g., a liquid crystal display panel, an organic light-emitting diode display, or a light-emitting diode display) may be adjusted to compensate the misalignment between the waveguide and light source in an assembly of a binocular display system, to compensate for relative movement between the two assemblies of the binocular display system, and/or brightness and color nonuniformity between the two assemblies.

According to certain embodiments, a near-eye display system may include a projector, a waveguide display, an active dimming layer between the waveguide display and the ambient environment, and a disparity camera (e.g., on a side of the waveguide display opposing the active dimming layer) for capturing both the displayed image and an image of the ambient environment viewed through the active dimming layer and the waveguide display. The active dimming layer may be dynamically controlled to attenuate the ambient light based on the measured brightness of the ambient environment. The disparity camera may be controlled to measure the ambient light that passes through the active dimming layer and the waveguide display in periods when the display is inactive between frames, or monitor the displayed image and measure the ambient light that passes through the active dimming layer and the waveguide display at the same time. In one example, a controller may control the projector to periodically stop displaying images, and the disparity camera may capture the image of the ambient environment to determine the brightness of the ambient environment when no images are displayed by the projector. The controller may also control the disparity camera to capture the displayed image and the image of the ambient environment in a same image frame to determine the regions of the ambient environment that may overlap with the displayed image in the field of view of the user's eye. The measured intensity of the ambient light in the overlapped region and passed through the active dimming layer and the waveguide display may be used to control the dimming of the active dimming layer.

In some examples, the near-eye display system may include two disparity cameras, one for capturing the ambient light and display light from the waveguide display for the left eye, the other one for capturing the ambient light and the display light from the waveguide display for the right eye. In some examples, the near-eye display system may include another optical combiner that may direct the display light and ambient light from both the waveguide display for the left eye and the waveguide display for the right eye to the same disparity camera. In one example, the optical combiner may include a smaller waveguide including input couplers and output couplers formed thereon or therein. In another example, the optical combiner may include a plurality of reflectors (e.g., mirrors or prisms).

In this way, one or two disparity cameras may be used for both monitoring the displayed image and measuring the ambient light that passes through the active dimming layer and the waveguide display. No additional camera may be needed for measuring the ambient light. Since the disparity camera has low effective resolution, the generated images may be processed by a localized sensor processor with no means to make the captured images available to store, alleviating possible privacy concerns.

In addition, the disparity camera behind the active dimming layer and the waveguide display may measure the intensity of the ambient light that is already attenuated by the active dimming layer, such that any variation of the response of the active dimming layer to electrical control signals can be taken into account by the controller of the active dimming layer to compensate the variation of the response of the active dimming layer. Therefore, the dimming level of the active dimming layer may be more accurately controlled to allow the appropriate amount of ambient light to pass through and mix with the display light. Furthermore, since the same camera is used to capture both the image of the ambient environment and the displayed image (e.g., in a same image frame), there may not be a need to map or align the image of the ambient environment to the displayed image or vice versa, which may further reduce the power consumption of the near-eye display system.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an extended reality system environment 100 including a near-eye display 120 in accordance with certain embodiments. Extended reality system environment 100 shown in FIG. 1 may include near-eye display 120, an optional external imaging device 150, and an optional input/output interface 140, each of which may be coupled to an optional console 110. While FIG. 1 shows an example of extended reality system environment 100 including one near-eye display 120, one external imaging device 150, and one input/output interface 140, any number of these components may be included in extended reality system environment 100, or any of the components may be omitted. For example, there may be multiple near-eye displays 120 monitored by one or more external imaging devices 150 in communication with console 110. In some configurations, extended reality system environment 100 may not include external imaging device 150, optional input/output interface 140, and optional console 110. In alternative configurations, different or additional components may be included in extended reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to function as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and extended reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a pre-dominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereo-scopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional opti-cal errors, three-dimensional optical errors, or any combi-nation thereof. Two-dimensional errors may include optical aberrations that occur in two dimensions. Example types of two-dimensional errors may include barrel distortion, pin-cushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to deter-mine the extended reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 12 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illumi-nates some or all of locators 126, which may retro-reflect the light to the light source in external imaging device 150. Slow calibration data may be communicated from external imag-ing device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measure-ment signals in response to motion of near-eye display 120. Examples of position sensors 128 may include accelerom-eters, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and mul-tiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accel-erometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodi-ments, the reference point may also be defined as a point within near-eye display 120 (e.g., a center of IMU 132).

Eye-tracking unit 130 may include one or more eye-tracking systems. Eye tracking may refer to determining an eye's position, including pupil position and gaze angle, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130).

Near-eye display 120 may use the eye tracking unit 130 to, e.g., determine an inter-pupillary distance (IPD) of the user, determine gaze direction, collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be established by measuring the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking subsystem 114, an extended reality engine 116, and an eye-tracking subsystem 118. Some embodiments of console 110 may include different or additional devices or subsystems than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, a solid-state drive (e.g., flash memory), or dynamic random access memory (DRAM). In various embodiments, the devices or subsystems of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking subsystem 114 may track movements of near-eye display 120 using slow calibration information from external imaging device 150. For example, headset tracking subsystem 114 may determine positions of a reference point of near-eye display 120 using observed locators from the slow calibration information and a model of near-eye display 120. Headset tracking subsystem 114 may also determine positions of a reference point of near-eye display 120 using position information from the fast calibration information. Additionally, in some embodiments, headset tracking subsystem 114 may use portions of the fast calibration information, the slow calibration information, or any combination thereof, to predict a future location of near-eye display 120. Headset tracking subsystem 114 may provide the estimated or predicted future position of near-eye display 120 to extended reality engine 116.

Extended reality engine 116 may execute applications within extended reality system environment 100 and receive position information of near-eye display 120, acceleration information of near-eye display 120, velocity information of near-eye display 120, predicted future positions of near-eye display 120, or any combination thereof from headset tracking subsystem 114. Extended reality engine 116 may also receive estimated pupil position and gaze direction information from eye-tracking subsystem 118. Based on the received information, extended reality engine 116 may determine content to provide to near-eye display 120 for presentation to the user. For example, if the received information indicates that the user has looked to the left, extended reality engine 116 may generate content for near-eye display 120 that mirrors the user's eye movement in a virtual environment. Additionally, extended reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking subsystem 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking subsystem 118 to more accurately determine the eye's orientation.

Figure 2:
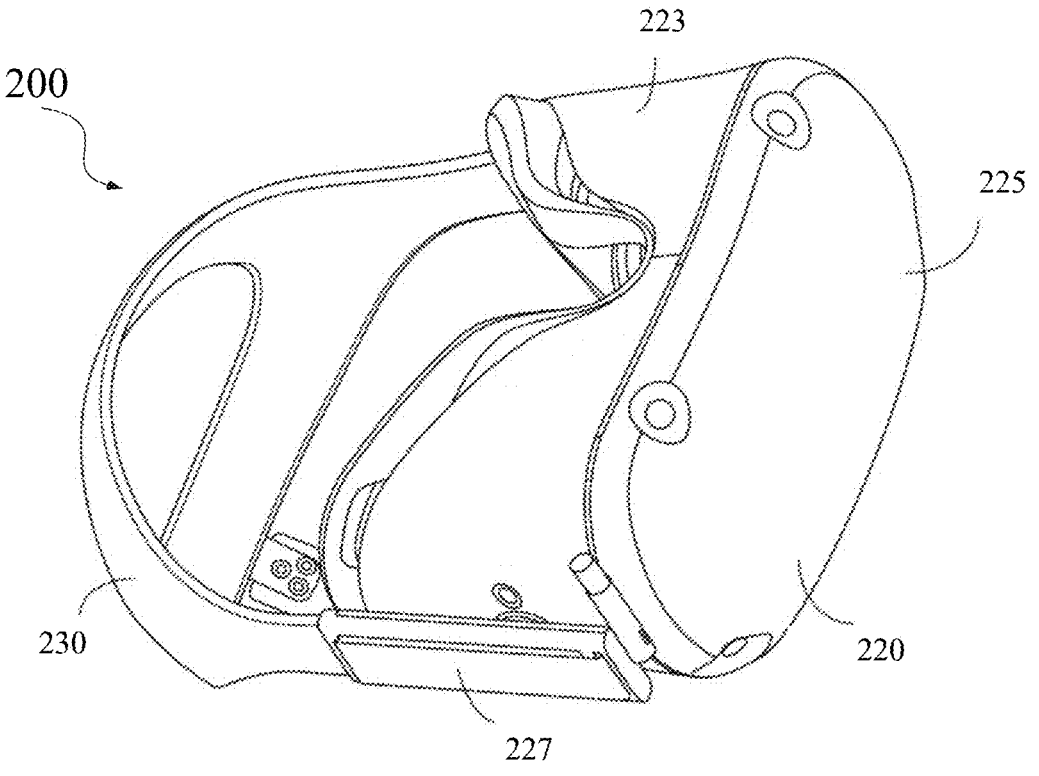
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO-LED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
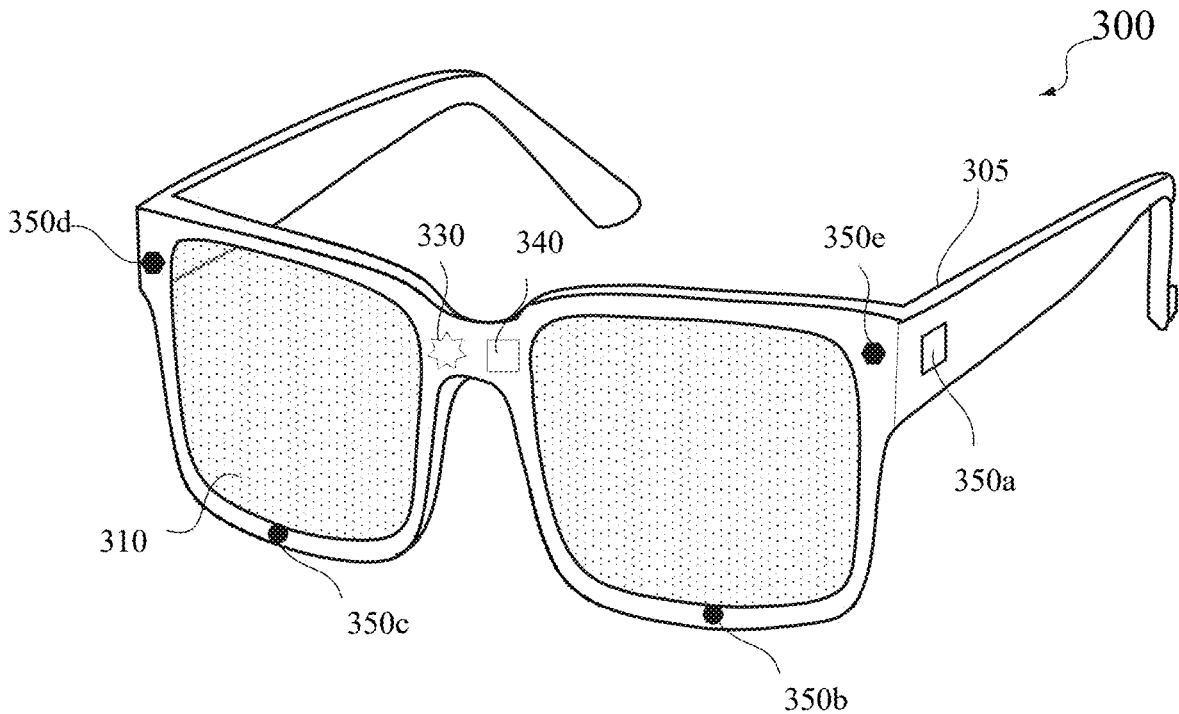
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., extended reality engine 116 of FIG. 1) to add virtual objects to the captured images or modify physical objects in the captured images, and the processed images may be displayed to the user by display 310 for AR or MR applications.

Figure 4:
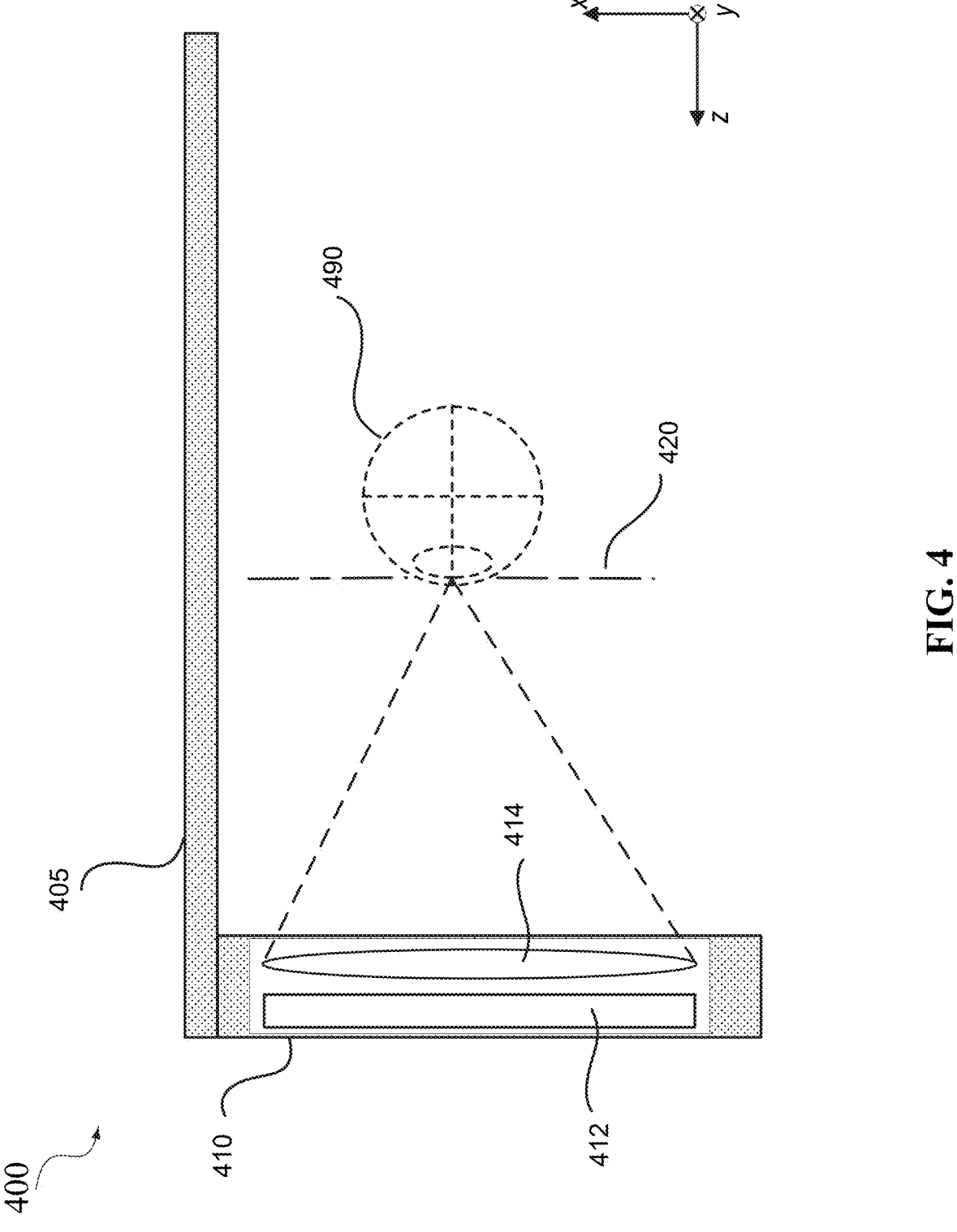
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 300, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal wave-guide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

Figure 5:
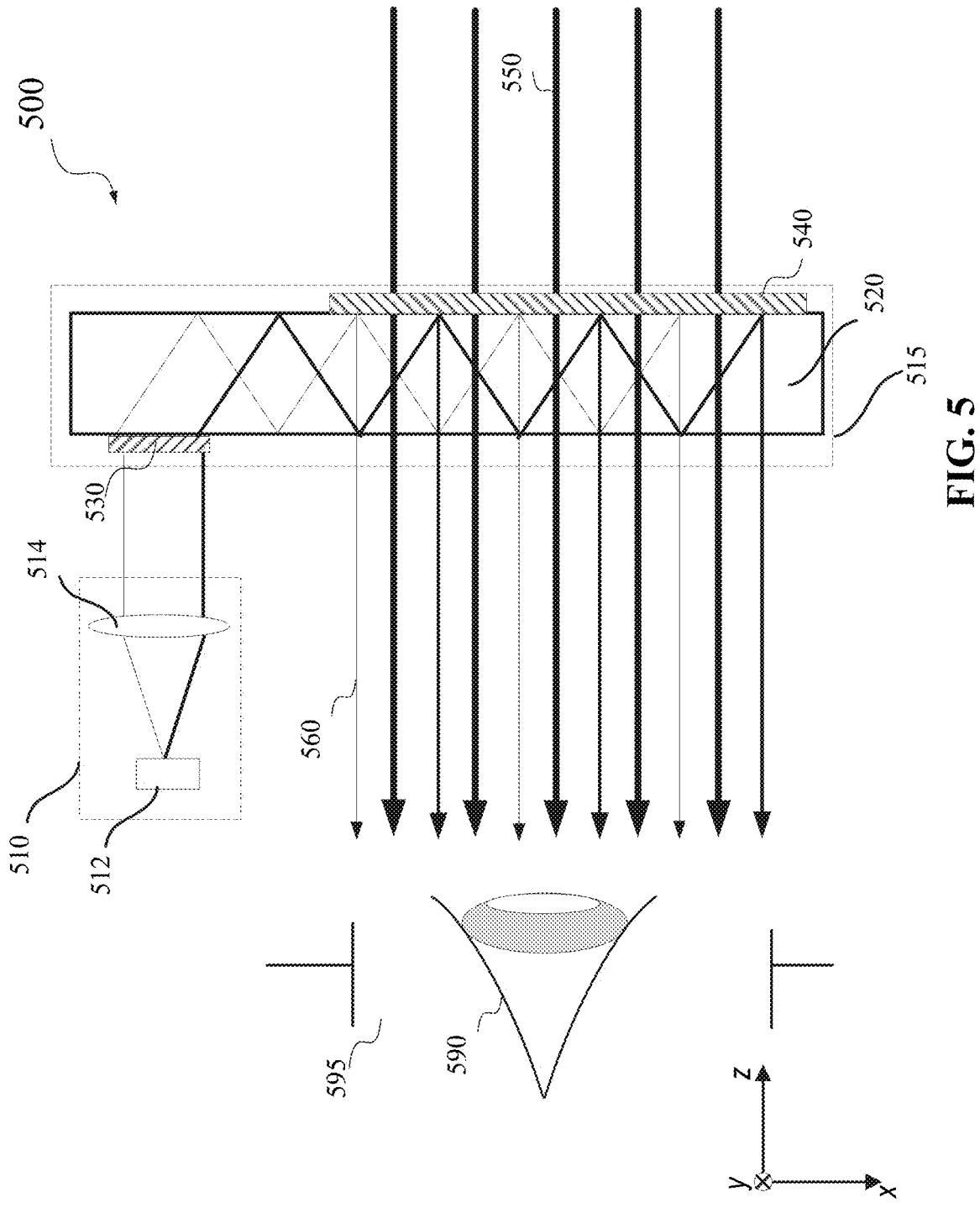
FIG. 5 illustrates an example of an optical see-through augmented reality system including a waveguide display according to certain embodiments.

FIG. 5 illustrates an example of an optical see-through augmented reality system 500 including a waveguide display according to certain embodiments. Augmented reality system 500 may include a projector 510 and a combiner 515. Projector 510 may include a light source or image source 512 and projector optics 514. In some embodiments, light source or image source 512 may include one or more micro-LED devices described above. In some embodiments, image source 512 may include a plurality of pixels that display virtual objects, such as an LCD display panel or an LED display panel. In some embodiments, image source 512 may include a light source that generates coherent or par-tially coherent light. For example, image source 512 may include a laser diode, a vertical cavity surface emitting laser, an LED, and/or a micro-LED described above. In some embodiments, image source 512 may include a plurality of light sources (e.g., an array of micro-LEDs described above), each emitting a monochromatic image light corre-sponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, aper-tures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating, a diffractive optical element (DOE) (e.g., a surface-relief grating), a slanted surface of substrate 520, or a refractive coupler (e.g., a wedge or a prism). For example, input coupler 530 may include a reflective volume Bragg grating or a transmissive volume Bragg grating. Input coupler 530 may have a high coupling efficiency for visible light. Light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(m-ethyl methacrylate) (PMMA), crystal, SiN, SiC, or ceramic. A thickness of the substrate may range from, for example, less than about 1 mm to about 12 mm or more. Substrate 520 may be transparent to visible light.

Substrate 520 may include or may be coupled to a plurality of output couplers 540, each configured to extract at least a portion of the light guided by and propagating within substrate 520 from substrate 520, and direct extracted light 560 to an eyebox 595 where an eye 590 of the user of augmented reality system 500 may be located when aug-mented reality system 500 is in use. The plurality of output couplers 540 may replicate the exit pupil to increase the size of eyebox 595 such that the displayed image is visible in a larger area. As input coupler 530, output couplers 540 may include grating couplers (e.g., volume holographic gratings or surface-relief gratings), other diffraction optical elements, prisms, etc. For example, output couplers 540 may include reflective volume Bragg gratings or transmissive volume Bragg gratings. Output couplers 540 may have different coupling (e.g., diffraction) efficiencies at different locations. Substrate 520 may also allow light 550 from the environ-ment in front of combiner 515 to pass through with little or no loss. Output couplers 540 may also allow light 550 to pass through with little loss. For example, in some imple-mentations, output couplers 540 may have a low diffraction efficiency for light 550 such that light 550 may be refracted or otherwise pass through output couplers 540 with little loss, and thus may have a higher intensity than extracted light 560. In some implementations, output couplers 540 may have a high diffraction efficiency for light 550 and may diffract light 550 in certain desired directions (i.e., diffrac-tion angles) with little loss. As a result, the user may be able to view combined images of the environment in front of combiner 515 and images of virtual objects projected by projector 510.

In some embodiments, projector 510, input coupler 530, and output coupler 540 may be on any side of substrate 520. Input coupler 530 and output coupler 540 may be reflective gratings (also referred to as reflective gratings) or transmis-sive gratings (also referred to as transmissive gratings) to couple display light into or out of substrate 520.

Figure 6:
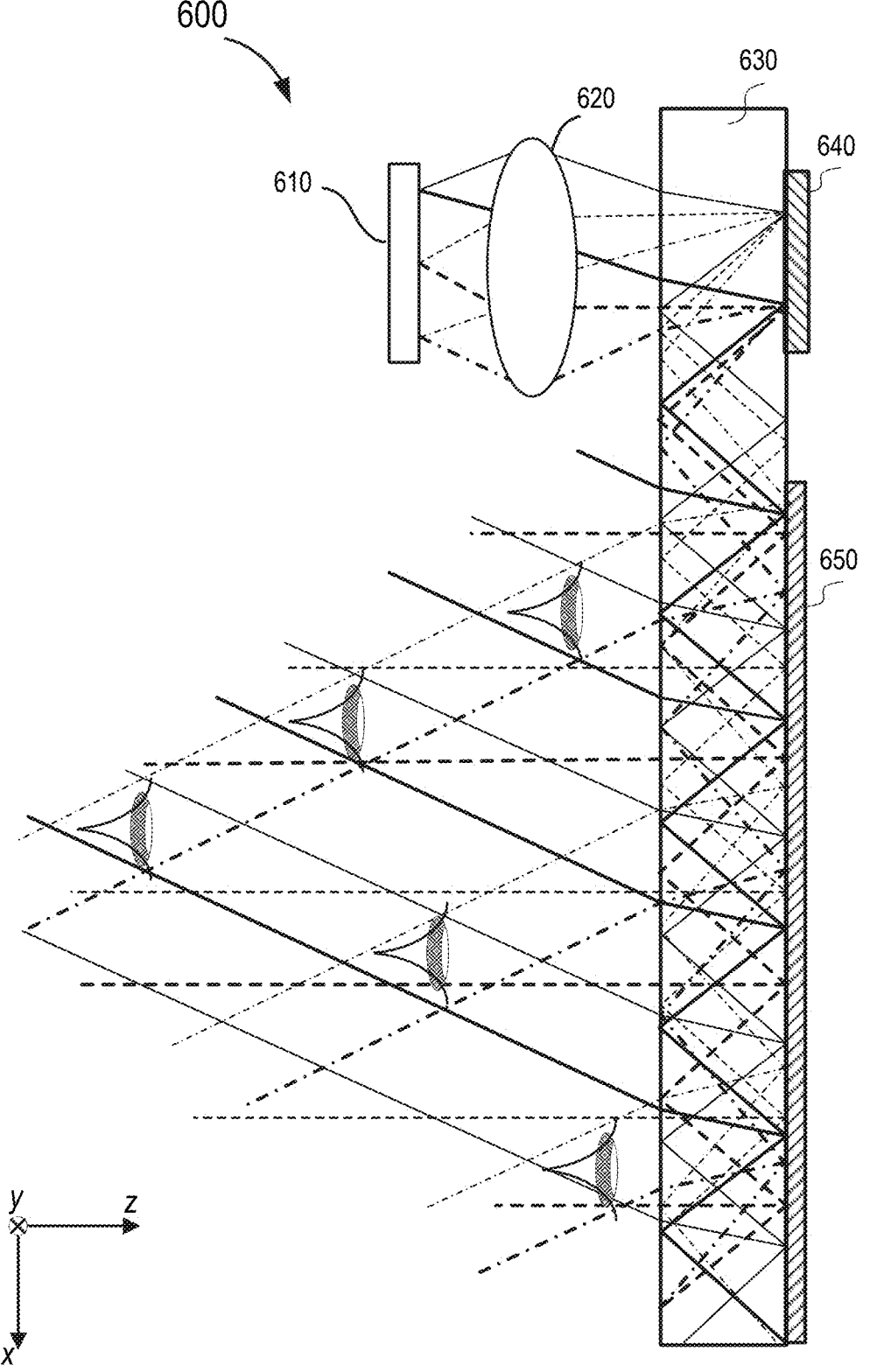
FIG. 6 illustrates an example of an optical see-through augmented reality system including a waveguide display for exit pupil expansion according to certain embodiments.

FIG. 6 illustrates an example of an optical see-through augmented reality system 600 including a waveguide dis-play for exit pupil expansion according to certain embodi-ments. Augmented reality system 600 may be similar to augmented reality system 500, and may include the waveguide display and a projector that may include a light source or image source 610 and projector optics 620. The waveguide display may include a substrate 630, an input coupler 640, and a plurality of output couplers 650 as described above with respect to augmented reality system 600. While FIG. 6 only shows the propagation of light from a single field of view, FIG. 6 shows the propagation of light from multiple fields of view.

FIG. 6 shows that the exit pupil is replicated by output couplers 650 to form an aggregated exit pupil or eyebox, where different regions in a field of view (e.g., different pixels on image source 610) may be associated with different respective propagation directions towards the eyebox, and light from a same field of view (e.g., the same pixel on image source 610) may have the same propagation direction for the different individual exit pupils. Thus, a single image of image source 610 may be formed by the user's eye located anywhere in the eyebox, where light from different individual exit pupils and propagating in the same direction may be from a same pixel on image source 610 and may be focused onto a same location on the retina of the user's eye. In other words, the user's eye may convert angular information in the eyebox or exit pupil (e.g., corresponding to a Fourier plane) to spatial information in images form on the retina. FIG. 6 shows that the image of the image source is visible by the user's eye even if the user's eye moves to different locations in the eyebox.

FIGS. 5 and 6 show that light of projected images may be coupled into a waveguide (e.g., a transparent substrate), propagate within the waveguide through total internal reflection, and be coupled out of the waveguide at multiple locations to replicate the exit pupil and expand the eyebox in one dimension. In some implementations, multiple waveguides and/or multiple couplers (e.g., gratings or transflective mirrors) may be used to replicate the exit pupil in two dimensions to fill a large eyebox with a 2D array of pupils, thereby expanding the eyebox such that the user's eyes can view the displayed images even if the user's eyes move within a large area. For example, two or more gratings may be used to expand the display light in two dimensions or along two axes. The two gratings may have different grating parameters, such that one grating may be used to replicate the exit pupil in one direction and the other grating may be used to replicate the exit pupil in another direction.

As described above, it is generally desirable that the near-eye display system has a small size, low weight, large field of view, large eyebox, high power efficiency, high brightness, high resolution, high refresh rate, low cost, long battery life, and long lifetime. It can be challenging to achieve these characteristics in a near-eye display system. For example, a near-eye display system is generally worn on a user's head (referred to as a head-mounted display), and thus the weight constraint may be much more restrictive than other battery-powered portable electronic devices, such as cell phones or touch pads. Therefore, a near-eye display system may be constrained in the amount of power that can be used by the display device, and it is desirable that the near-eye display system can have a low power consumption to improve the battery life and/or reduce the weight of the near-eye display system. However, the image source of the near-eye display system may have limited power efficiency, and the display optics may also have limited optical efficiency due to, for example, limited coupling efficiencies of the optical couplers for coupling light from the image source into and out of a waveguide. Therefore, the image source (e.g., a display panel) of a near-eye display system may often need to have a high power consumption in order to provide bright, high-resolution, and high-refresh rate images with a large color gamut and a large field of view (FOV) to improve the immersive experience of using the head-mounted display. It can be challenging to achieve high output image brightness but low power consumption in near-eye display systems.

The amount of power consumption of a near-eye display system may depend on several factors, including the brightness of the displayed images. Reducing the brightness of the displayed images may significantly reduce the power consumption of the display system. Therefore, one way to reduce the power consumption by the near-eye display system is to reduce the brightness of the pixels globally. Reducing the brightness of the pixels can also increase their lifetime (e.g., reducing pixel burnout), thereby increasing the overall lifespan of the near-eye display system. However, reducing the overall brightness of the pixels may negatively impact the user experience from an image quality perspective. In particular, when a near-eye display system is used outdoors under the sunlight, the brightness of the displayed images may need to be sufficiently high compared to the bright sunlight in the ambient environment such that the displayed images can be viewed by the user with the bright ambient environment in the background. In some near-eye display systems, the image source may not be able to provide the desired high output power and brightness for outdoor use, due to the limited maximum output power of the image source. Even if the image source can provide the desired high output power, the near-eye display system may be unsafe for user's eyes, in particular, when the pupil of the user's eye is dilated. In addition, the electron-to-photon conversion efficiency of LED illuminators decreases with higher current, progressively impacting the battery life of the near-eye display systems.

In some near-eye display systems, an active dimming layer may be used to dim the ambient light, such that the brightness of the images displayed by the image source can also be reduced to reduce power consumption, while the relative brightness (e.g., the contrast) between the displayed images and the ambient light can still be sufficiently high for the user to comfortably view the displayed content superimposed on the image formed by dimmed ambient light. The active dimming layer may need to be dimmed based on the brightness of the ambient environment, in order to achieve the desired contrast between the displayed images and the ambient environment in the augmented or mixed reality images. For example, when the ambient environment is brighter, the ambient light may be attenuated more by the active dimming layer. The active dimming layer may be on a side of the waveguide display opposing the user eyes (e.g., between the ambient environment and the waveguide display) such that the active dimming layer may dim the ambient light but may not dim the images displayed to the user's eye by the waveguide display.

Figure 7:
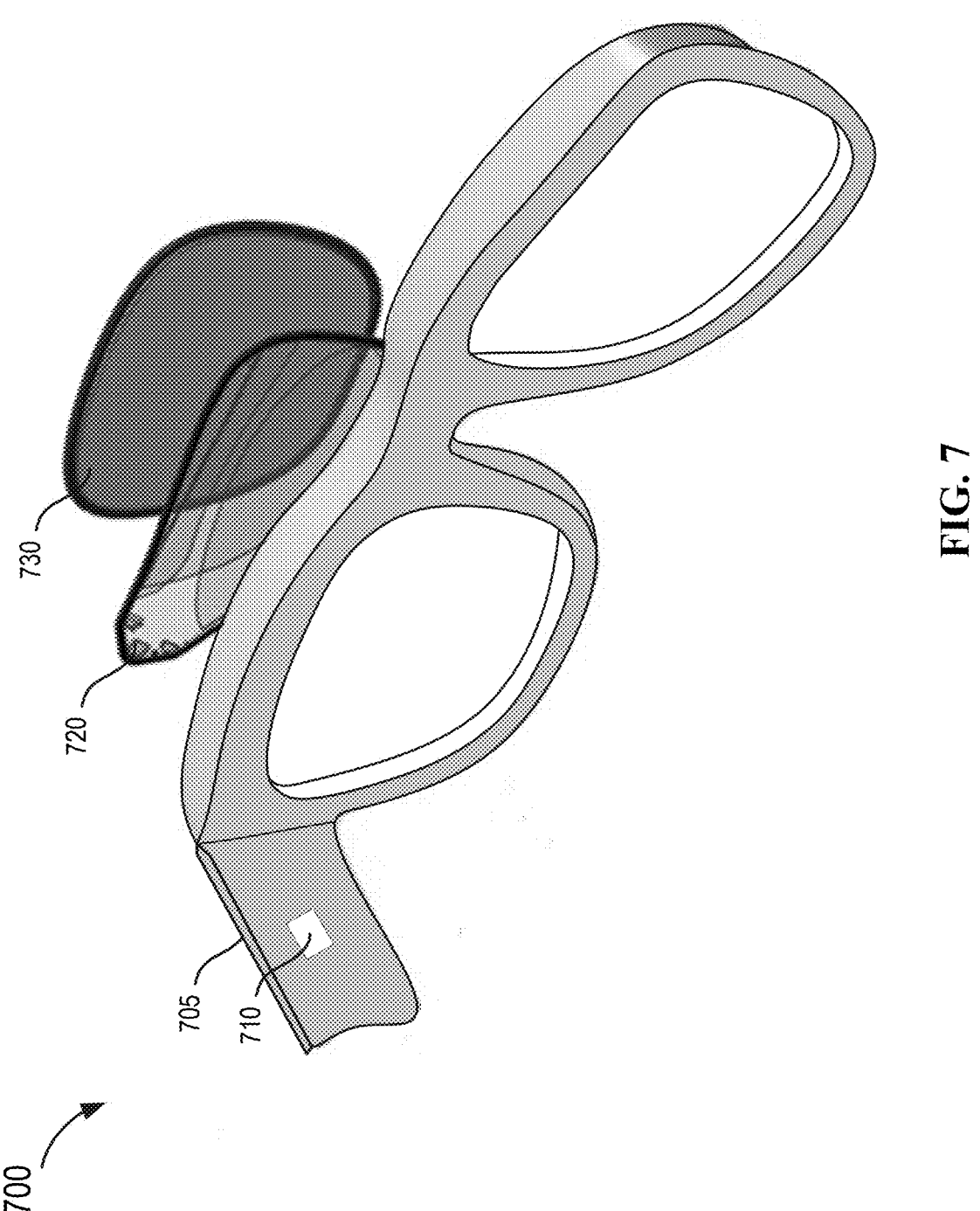
FIG. 7 illustrates an example of an optical see-through near-eye display system including a waveguide display and an active dimming layer for each eye according to certain embodiments.

FIG. 7 illustrates an example of an optical see-through near-eye display system 700 including a waveguide display and an active dimming layer for each eye according to certain embodiments. In the illustrated example, near-eye display system 700 may be in a form of a pair of glasses that may include a frame 705, a left side waveguide display 720, and a right side waveguide display (not shown in FIG. 7). A first set of one or more projectors 710 may be at least partially embedded in the left temple of frame 705, and a second set of one or more projectors may be at least partially embedded in the right temple of frame 705. Waveguide display 720 may include a set of one or more input couplers and a set of one or more output couplers formed on or in a waveguide (e.g., a flat or curved glass substrate such as a lens). The set of one or more input couplers may couple display light from the one or more projectors 710 into the waveguide, and the set of one or more output couplers may replicate the display light in one or two directions and direct the display light to an eyebox to fill the eyebox as described above.

Near-eye display system 700 may also include an active dimming layer 730 between waveguide display 720 and the ambient environment (e.g., on a side of waveguide display 720 opposing the user's eye), such that the ambient light may be attenuated by active dimming layer 730 before being combined (e.g., mixed or superimposed) with display light by waveguide display 720 that may function as an optical combiner. Active dimming layer 730 may have different transparency or opacity when different voltage signal levels are applied to it. For example, if the intensity of the ambient light is higher, active dimming layer 730 may be controlled to reduce its transmissivity such that the ambient light may be attenuated more before being combined with the display light and thus may not affect the viewing of the displayed images by the user's eyes. Active dimming layer 730 may include, for example, an electrochromic material (e.g., including tungsten trioxide ($WO_3$)), a photochromic material, a liquid crystal (LC) layer, or a material with suspended nano-scale particles. In one example, active dimming layer 730 may include a liquid crystal material layer that can be tuned by applying an electrical field to change orientations of the LC molecules, thereby changing the transmissivity of active dimming layer 730 for the ambient light. The LC-based active dimming layer may be implemented using, for example, a polymer-dispersed liquid crystal (PDLC) light dimming device, a guest-host liquid crystal (GHLC) light dimming device, or a polymer-stabilized cholesteric texture (PSCT) liquid crystal light dimming device.

In order to automatically control the dimming of active dimming layer 730, near-eye display system 700 may need to measure the brightness or intensity of the ambient light and adjust the transparency of active dimming layer 730 accordingly. Some near-eye display systems may use a forward-facing Simultaneous Localization And Mapping (SLAM) or Point-of-View (POV) cameras for ambient light measurement. For example, one or more of sensors 350*b*, 350*c*, 350*d*, and 350*e* may be the forward-facing cameras for capturing images of the ambient environment to determine the brightness of regions of the ambient environment. But there may be multiple challenges associated with using the brightness of the ambient light measured by the forward-facing camera for adaptive dimming. For example, since the bright areas of the ambient environment that are behind the displayed image may affect the user's viewing of the displayed image the most, whereas the bright areas outside of the area of the displayed image may have little or no effect on the user's viewing of the displayed image, the images of the ambient environment captured by the forward-facing camera may need to be registered (e.g., mapped) into the display coordinate space or vice versa, in order to determine the effect of the bright areas of the ambient environment that are behind the displayed image and the appropriate amount of attenuation of the ambient light. In addition, to enable the forward-facing cameras, the privacy light may need to be turned on, which may be noticeable and may not be socially acceptable in all situations where dimming is needed. Furthermore, the voltage level for controlling the active dimming layer to attenuate the ambient light by a certain amount (e.g., a certain percentage) may change over time due to, for example, aging and degradation of the dimming layer caused by UV radiation. To better estimate and control the amount of ambient light that passes through the active dimming layer and reaches the waveguide display, it may be beneficial and desirable to measure the brightness of the ambient light passed through the active dimming layer.

In addition, misalignments (e.g., relative tip, tilt, and rotation) between the waveguide display (e.g., the substrate of waveguide display 720) and the light source (e.g., one or more projectors 710) and the misalignment or relative movement of an assembly that includes a waveguide display for the left eye with respect to another assembly that includes a waveguide display for the right eye may cause the displayed images presented to the left eye and the right eye of the user to be different from the desired two-dimensional (2D) display images that show objects with correct binocular disparity such that the user's brain may extract proper depth information from the two 2D images captured by the two eyes through stereopsis. Therefore, the user may see two images of a same object and other undesired optical artifacts, such as brightness and/or color mismatch or non-uniformity, which may also degrade the user experience of using the near-eye display system. For example, due to misalignments of components of the display, nonuniformity of the output power of the projector for the left eye and the projector for the right eye, nonuniformity of the optical efficiencies of the waveguide display for the left eye and the waveguide display for the right eye, the displayed image for the first eye and the displayed image for the second eye may have different brightnesses and/or different colors.

In some implementations, to reduce or otherwise mitigate the undesired optical artifacts caused by the misalignment or relative movement described above, and to facilitate dynamic uniformity correction and de-warping of the display, one or more disparity couplers (on one side or both sides of the waveguide) may be used on the nasal side of the waveguide for each eye to couple some light (e.g., light of a displayed image or a disparity test light pattern) from the light source out of the waveguide at the nasal side of the waveguide to monitor the displayed images. One or two disparity sensors may detect the light for disparity test from the two waveguides for two eyes, to determine boresight and alignment errors between the left image and the right image in the binocular near-eye display system, such that the projector(s) and/or the images generated by the display panel (e.g., a liquid crystal display panel, an organic light-emitting diode display, or a light-emitting diode display) may be adjusted to compensate the misalignment between the waveguide and light source in an assembly of a binocular display system, relative movement between the two assemblies of the binocular display system, and/or brightness and color nonuniformity between the two assemblies.

Figure 8:
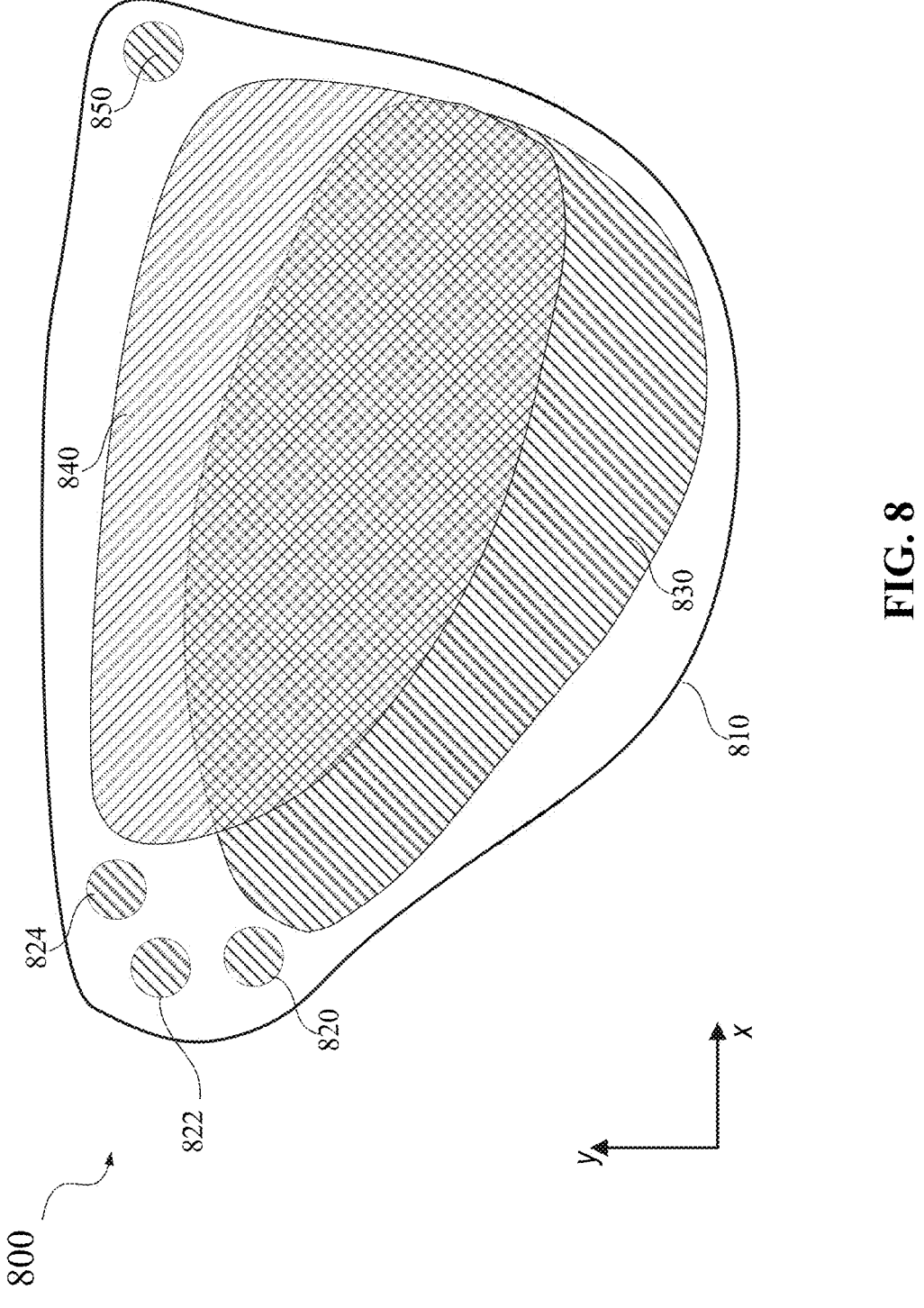
FIG. 8 illustrates an example of a waveguide display including one or more disparity gratings according to certain embodiments.

FIG. 8 illustrates an example of a waveguide display 800 including one or more disparity couplers (e.g., gratings) according to certain embodiments. Waveguide display 800 may be an example of waveguide display 720 described above. Waveguide display 800 may include a substrate 810, one or more input gratings, a first output grating 830, a second output grating 840, and one or more disparity gratings 850. In the example shown in FIG. 8, the one or more input gratings may include three input gratings for coupling display light and/or disparity test light of three different colors. For example, an input grating 820 may be used to couple red light into substrate 810, an input grating 822 may be used to couple green light into substrate 810, and an input grating 824 may be used to couple blue light into substrate 810.

Light coupled into substrate 810 by the one or more input gratings may be guided by total internal reflection to propagate within substrate 810 along a first direction, and may reach first output grating 830. First output grating 830 may redirect, at multiple locations along the first direction, the display light and/or the disparity test light to a second direction towards second output grating 840. Second output grating 840 may couple portions of the display light and/or the disparity test light out of substrate 810 at multiple locations along both the first direction and the second direction to produce a two-dimensional array of exit pupils to fill the eyebox as described above. At least a portion of the light for disparity test may reach one or more disparity gratings 850. The one or more disparity gratings 850 may include a disparity grating having the same or similar grating vectors as second output grating 840, and thus may at least partially couple a portion of the light for disparity test out of substrate 810 towards a disparity camera.

According to certain embodiments disclosed herein, a near-eye display system may include a projector, a waveguide display, an active dimming layer between the waveguide display and the ambient environment, and a disparity camera (e.g., on a side of the waveguide display opposing the active dimming layer) for capturing both the displayed image and an image of the ambient environment viewed through the active dimming layer and the waveguide display. The active dimming layer may be dynamically controlled to attenuate the ambient light based on the measured brightness of the ambient environment. The disparity camera may be controlled to measure the ambient light that passes through the active dimming layer and the waveguide display in some time periods, or measure the displayed image superimposed on the ambient light that passes through the active dimming layer and the waveguide display at the same time during some time periods. In one example, a controller may control the projector to periodically stop displaying images or disparity light patterns (e.g. in display blanking periods), and the disparity camera may capture the image of the ambient environment to determine the brightness of the ambient environment when no images or disparity light patterns are displayed by the projector. The controller captures the displayed image and the image of the ambient environment in the same image frame to determine the regions of the ambient environment that may overlap with the displayed image in the field of view of the user's eye. The measured intensity of the ambient light in the overlapped region and passed through the active dimming layer and the waveguide display may be used to control the dimming of the active dimming layer.

Figure 9:
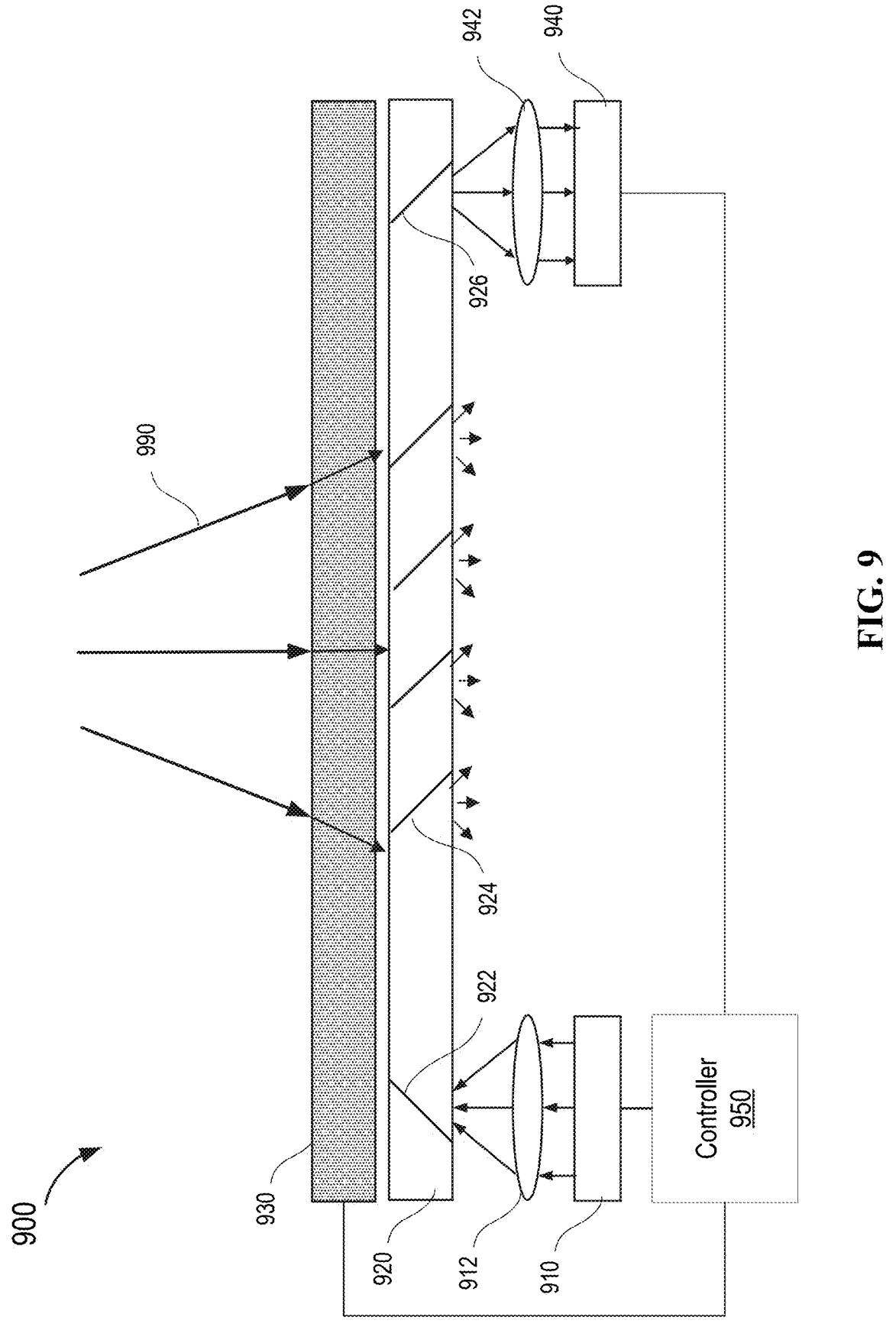
FIG. 9 illustrates an example of a waveguide display system including an active dimming layer and a disparity camera according to certain embodiments.

FIG. 9 illustrates an example of a waveguide display system 900 including an active dimming layer 930 and a disparity camera according to certain embodiments. Waveguide display system 900 may be a subsystem of near-eye display system 700 and may be used for one eye in a binocular display system. In the illustrated example, waveguide display system 900 may include a projector that includes an image source 910 and projector optics 912. Image source 910 may include a display panel, such as an LCD, OLED, or micro-LED based display panel described above, and may be controlled by a controller 950 to generate images to be displayed to the user and/or generate display test light patterns for disparity detection and correction. Projector optics 912 may collimate light emitted by image source 910 of the displayed images and direct the display light towards a waveguide 920 to illuminate the entry pupil of waveguide display system 900. In some embodiments, the projector may alternatively or additionally generate a disparity test light pattern and project the disparity test light pattern onto waveguide 920. In some embodiments, the disparity test light pattern may include infrared light that may not be visible by the user's eyes and thus may not affect the viewing of the displayed images by the user's eyes.

Waveguide 920 may include a substrate transparent to visible light, such as a glass substrate (e.g., a flat or curved lens). An input coupler 922 may be formed on or in waveguide 920 and may receive the display light from the projector. Input coupler 922 may include, for example, a grating coupler (e.g., a holographic grating coupler or a surface-relief grating coupler), or a plurality of transflective mirrors. Input coupler 922 may couple the display light and/or disparity test light into waveguide 920. The display light coupled into waveguide 920 may be guided by waveguide 920 through, for example, total internal reflection at the surfaces of waveguide 920. During the propagation within waveguide 920, portions of the display light may be coupled out of waveguide 920 towards an eyebox by a plurality of output couplers 924. In the illustrated example, output couplers 924 may include transflective mirrors and waveguide 920 may be referred to as a geometric waveguide. At least a portion of the display light or the disparity test light may be coupled out of waveguide 920 by one or more disparity output couplers 926, such as one or more transflective mirrors, at a peripheral region of waveguide 920. The portion of the display light or the disparity test light coupled out of waveguide 920 by one or more disparity output couplers 926 may be collected by a disparity camera that may include camera optics 942 and an image sensor 940. The display camera may be electrically coupled to controller 950 or another controller coupled to controller 950, such that controller 950 may receive the images captured by the disparity camera and adjust the displayed images for disparity correction based on the captured images.

As shown in FIG. 9, waveguide display system 900 may include active dimming layer 930 on a side of waveguide 920 opposing the user's eye and the disparity camera. There may be an air gap (e.g., formed by a spacer) between active dimming layer 930 and waveguide 920 so that the light coupled into waveguide 920 may be reflected at the interfaces between waveguide 920 and air through total internal reflection. Active dimming layer 930 may include, for example, an electrochromic active dimming layer, a photochromic active dimming layer, a liquid crystal (LC) based active dimming layer, or an active dimming layer including suspended nano-scale particles. Active dimming layer 930 may be controlled by a controller 950 to change the attenuation of ambient light 990 (e.g., sunlight) by active dimming layer 930. Ambient light passed through active dimming layer 930 may be combined with the display light by waveguide 920, so that the ambient light may be superimposed on the display light to form augmented reality or mixed reality images. Ambient light may pass through waveguide 920 and may then be partially collected by the disparity camera. In some examples, ambient light may pass through waveguide 920 and may be partially coupled into and guided by waveguide 920 towards disparity output couplers 926, which may couple the ambient light out of waveguide 920 towards the disparity camera. As such, the disparity camera may also capture images of the ambient environment. The captured images of the ambient environment may be sent to controller 950, which may determine the brightness or intensity of the ambient light and generate appropriate control signals to control the dimming of active dimming layer 930.

In this way, one or two disparity cameras may be used for both monitoring disparity between the left-, and right-side displayed images, and measuring the ambient light that passes through the active dimming layer and the waveguide display, eliminating the need for an additional camera to measure ambient light. Since the disparity camera images are locally processed by controller 950, and are not made available outside the device by means of either wired or wireless access, privacy concerns are effectively addressed. In addition, the disparity camera behind the active dimming layer and the waveguide display may measure the intensity of the ambient light that is already attenuated by the active dimming layer, such that any variation of the response of the active dimming layer to electrical control signals can be taken into account by the controller of the active dimming layer to compensate the variation of the response of the active dimming layer. Therefore, the dimming level of the active dimming layer may be more accurately controlled to allow the appropriate amount of ambient light to pass through and mix with the display light. Furthermore, since the same camera is used to capture both the image of the ambient environment and the displayed image (e.g., in a same image frame), there may not be a need to map or align the image of the ambient environment to the displayed image or vice versa, which may further reduce the power consumption of the near-eye display system.

In some examples, the near-eye display system may include two disparity cameras, one for capturing the ambient light and display light from the waveguide display for the left eye, the other one for capturing the ambient light and the display light from the waveguide display for the right eye. In some examples, the near-eye display system may include another optical combiner that may direct the display light and ambient light from both the waveguide display for the left eye and the waveguide display for the right eye to the same disparity camera. In one example, the optical combiner may include a smaller waveguide including input couplers and output couplers formed thereon or therein. In another example, the display light and ambient light from both the waveguide display for the left eye and the waveguide display for the right eye may be directed by a reflector assembly to the disparity camera. For example, the reflector assembly may include a pair of prisms for each of the left side and the right side of a near-eye display system. In another example, the reflector assembly may include a pair of mirrors for each of the left side and the right side of a near-eye display system.

Figure 10:
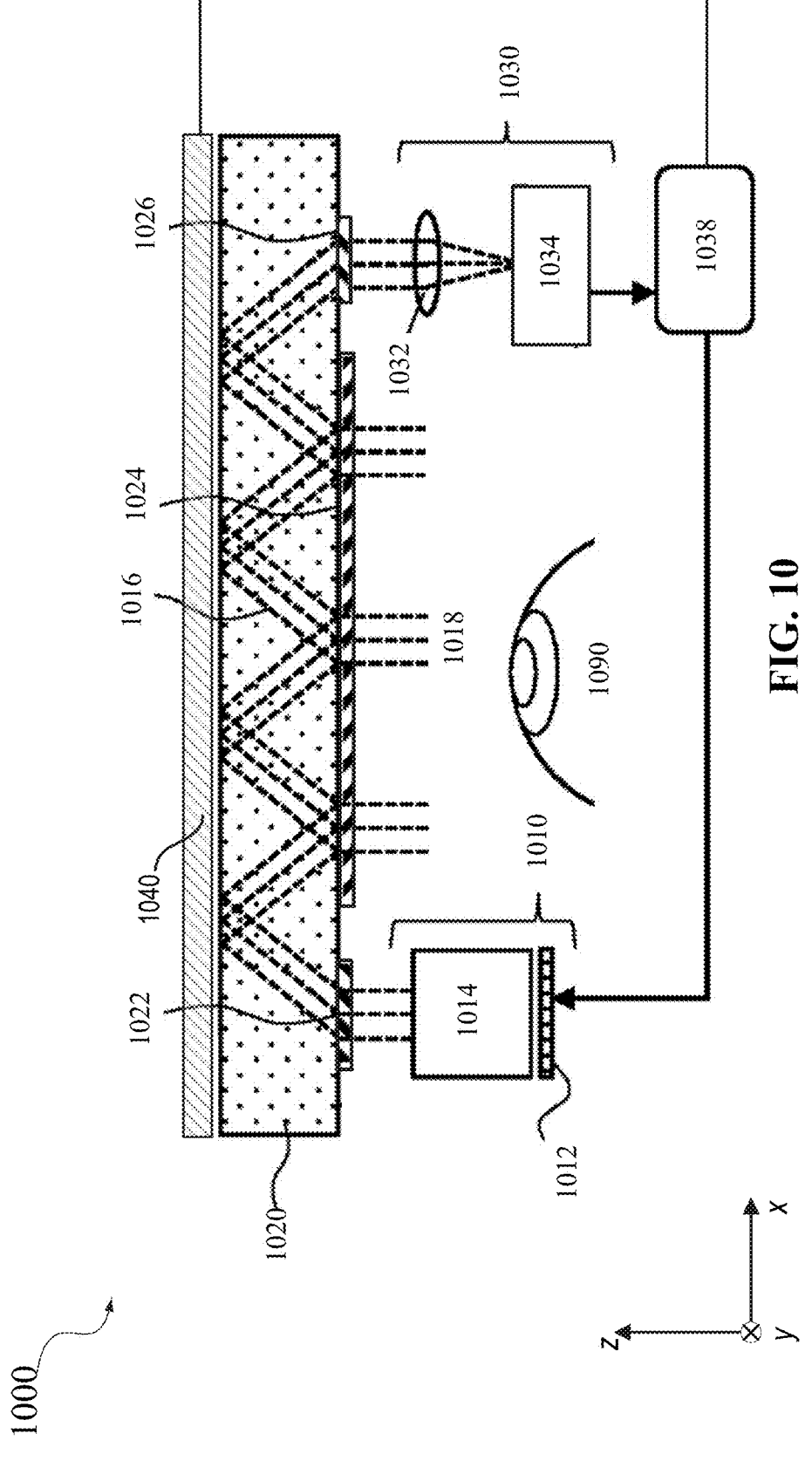
FIG. 10 illustrates an example of a waveguide display system including an active dimming layer and a disparity camera according to certain embodiments.

FIG. 10 illustrates an example of a waveguide display system 1000 including an active dimming layer 1040 and a disparity camera 1030 according to certain embodiments. Waveguide display system 1000 may be a subsystem of a binocular near-eye display system. In the illustrated example, waveguide display system 1000 may include a projector 1010 that may provide display light and/or disparity test light 1016 to a waveguide 1020. Disparity test light 1016 may carry a certain disparity test pattern, such as a structured light pattern (e.g., a fringe pattern or a dot array). In one example, projector 1010 may include a display panel 1012 and projector optics 1014. Display panel 1012 may include, for example, an LCD, OLED, or micro-LED display panel. In some embodiments, projector 1010 may be of a different type, such as a scanning type projector including one or more lasers and a scanner. In some examples, projector 1010 may be a dual function projector that may provide the disparity test pattern for tilt/disparity sensing and also provide displayed images for presenting to a user's eye 1090. In some embodiments, projector 1010 may be used solely for providing the disparity test pattern for waveguide tilt/binocular disparity sensing, and another projector may be used to provide displayed images for presenting to user's eye 1090. In some embodiments, the disparity test pattern may be made invisible to the user, for example, by providing a disparity test pattern in invisible light such as near infrared (NIR) light, presenting the disparity test pattern outside of the display's field of view (FOV), presenting the disparity test pattern when the user's eye blinks, and the like.

The disparity test pattern and/or the display light may be coupled into waveguide 1020 by an input coupler 1022, such as a grating coupler, at a first end of waveguide 1020. Waveguide 1020 may be a one-dimensional or two-dimensional pupil-replicating waveguide as described above, and may guide the disparity test light 1016 and/or the display light by a series of total internal reflections (TIRs) at opposing surfaces of waveguide 1020. Waveguide 1020 may include at least one output coupler 1024, such as a diffraction grating, for out-coupling portions 1018 of the display light to the user's eye 1090. Waveguide 1020 may further include at least one output coupler 1026 at an end of waveguide 1020 for out-coupling at least a portion of the disparity test light or display light to disparity camera 1030. Output coupler 1026 may be a part of output coupler 1024, or may be separate from output coupler 1024 but may have the same grating vector as output coupler 1024. As described above, input coupler 1022, output coupler 1024, and output coupler 1026 may include, for example, holographic gratings, surface-relief gratings, transflective mirrors, polarization volume gratings, and the like.

Disparity camera 1030 of waveguide display system 1000 may be configured to receive the disparity test light and/or display light from waveguide 1020. In the illustrated example, disparity camera 1030 may include a focusing element 1032 (e.g., a lens) that may focus the disparity test light and/or display light from output coupler 1026 to form a replicated image of the disparity test pattern and/or the displayed image onto an image sensor 1034 of disparity camera 1030, which may include a two-dimensional (2D) array of pixels and may generate output signals representing the image.

Waveguide display system 1000 may include a controller 1038 coupled to projector 1010 and image sensor 1034. Controller 1038 may be configured to cause the projector 1010 to provide the display light and/or disparity test light, receive the output signals from image sensor 1034, and determine the tilt or other misalignments of waveguide 1020 with respect to projector 1010 based on the output signals generated by image sensor 1034. For example, the tilt or other misalignments may be determined based on the position and/or orientation of the displayed image and/or disparity test light pattern in the image captured by image sensor 1034. In some examples, controller 1038 may also receive output signals from the image sensor of a waveguide display system for another eye of the user, and determine the disparity between the two waveguide display systems for the two eyes of the user, such as the misalignment between the two waveguide display systems and the difference in the brightness and/or color of the displayed images and/or the disparity test light patterns output by the two waveguide display systems. Controller 1038 may then control the projectors of the two waveguide display systems to compensate the disparity by, for example, changing the field of view, orientation, and/or brightness of the displayed image generated by the image source of one or both projectors.

Waveguide display system 1000 may include active dimming layer 1040 on a side of waveguide 1020 opposing the user's eye and disparity camera 1030. There may be an air gap (e.g., formed by a spacer) between active dimming layer 1040 and waveguide 1020 so that the light coupled into the waveguide may be reflected at the interface between waveguide 1020 and air through total internal reflection. Active dimming layer 1040 may include, for example, an electrochromic active dimming layer, a photochromic active dimming layer, a liquid crystal based active dimming layer, or an active dimming layer including suspended nano-scale particles. Active dimming layer 1040 may be controlled by controller 1038 to change the attenuation of the ambient light (e.g., sunlight) by active dimming layer 1040. Ambient light passed through active dimming layer 1040 may be combined with the display light by waveguide 1020, such that the display light may be superimposed on the ambient light to form augmented reality or mixed reality images. Ambient light passed through waveguide 1020 may be partially collected by disparity camera 1030. In some examples, ambient light passed through active dimming layer 1040 may be partially coupled into and guided by waveguide 1020 towards output coupler 1026, which may couple the ambient light out of waveguide 1020 towards disparity camera 1030. As such, disparity camera 1030 may also capture images of the ambient environment. The captured images of the ambient environment may be sent to controller 1038, which may determine the brightness or intensity of the ambient light and generate appropriate control signals to control the dimming of active dimming layer 1040. For example, as described above, controller 1038 may determine the average, maximum, and/or minimum brightness of the area of the ambient environment that overlaps the displayed image in the images captured by disparity camera 1030, and control the dimming of active dimming layer 1040 based on the determined average, maximum, and/or minimum brightness.

Figure 11:
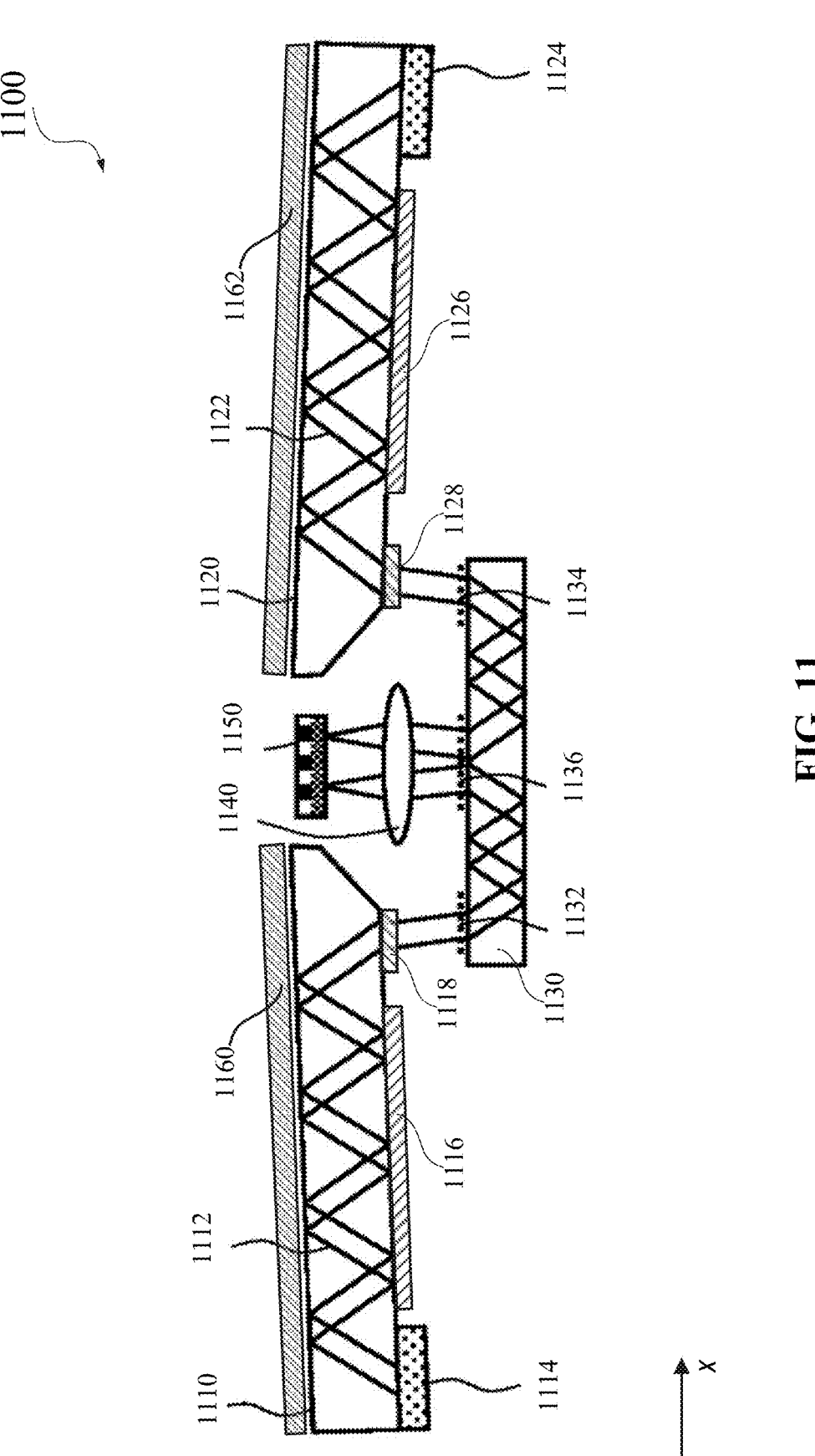
FIG. 11 illustrates an example of a near-eye display system including a waveguide structure for coupling disparity test light and ambient light from two pupil-replicating waveguides to a common disparity camera for binocular disparity sensing and active dimming according to certain embodiments.

FIG. 11 illustrates an example of a near-eye display system 1100 including a waveguide structure 1130 for coupling disparity test light and ambient light from two pupil-replicating waveguide displays to a common disparity camera for binocular disparity sensing and active dimming according to certain embodiments. In the example illustrated in FIG. 11, near-eye display system 1100 may include a first pupil-replicating waveguide display 1110, a second pupil-replicating waveguide display 1120, waveguide structure 1130, and a disparity camera including a focusing element 1140 and an image sensor 1150. Even though FIG. 11 shows that the disparity camera is on the same side of waveguide structure 1130 as first pupil-replicating waveguide display 1110 and second pupil-replicating waveguide display 1120, the disparity camera may be on the side of waveguide structure 1130 opposing first pupil-replicating waveguide display 1110 and second pupil-replicating waveguide display 1120 in some other examples.

First pupil-replicating waveguide display 1110 may be similar to waveguide display system 1000 described above, and may include a projector (not shown), a waveguide display, and an active dimming layer 1160. The projector may be similar to projector 1010 described above. The waveguide display may include a waveguide 1112 (e.g., a substrate transparent to visible light), an input coupler 1114 for couple display light and/or disparity test light into waveguide 1112, one or more output couplers 1116 configured to couple portions of the display light out of waveguide 1112 to an eyebox for the left eye of the user, and one or more disparity couplers 1118 configured to couple the disparity test light (or display light) out of waveguide 1112. The disparity test light (or display light) coupled out of waveguide 1112 may be coupled into the waveguide of waveguide structure 1130 by an input coupler 1132 and coupled out of waveguide structure 1130 by an output coupler 1136 towards focusing element 1140 and image sensor 1150. Waveguide structure 1130 may be a one-dimensional waveguide and may guide the in-coupled disparity test light (or display light) to propagate in one direction (e.g., the x direction). In some examples, output coupler 1136 may be on an opposite side (e.g., bottom side) of waveguide structure 1130, and focusing element 1140 and image sensor 1150 may be on the side of waveguide structure 1130 opposing first pupil-replicating waveguide display 1110 and second pupil-replicating waveguide display 1120 in some other examples. As described above, input coupler 1114, output couplers 1116, disparity couplers 1118, input coupler 1132, and output coupler 1136 may include, for example, holographic gratings, surface-relief gratings, transflective mirrors, polarization volume gratings, and the like.

Active dimming layer 1160 may be on a side of waveguide 1112 opposing the user's eye. There may be an air gap (e.g., formed by a spacer) between active dimming layer 1160 and waveguide 1112 so that the light coupled into waveguide 1112 may be reflected at the interface between waveguide 1112 and air through total internal reflection. Active dimming layer 1160 may include, for example, an electrochromic active dimming layer, a photochromic active dimming layer, a liquid crystal based active dimming layer, or an active dimming layer including suspended nano-scale particles. Active dimming layer 1160 may be controlled by a controller (e.g., controller 1038, not shown in FIG. 11) to change the attenuation of the ambient light (e.g., sunlight) by active dimming layer 1160. Ambient light passed through active dimming layer 1160 may be combined with the display light by waveguide 1112, so that the ambient light may be superimposed on the display light to form augmented reality or mixed reality images. Ambient light passed through waveguide 1112 may be partially coupled into waveguide structure 1130. In some examples, ambient light that passes through active dimming layer 1160 may be partially coupled into and guided by waveguide 1112 towards disparity couplers 1118, which may couple the ambient light out of waveguide 1112 towards waveguide structure 1130. The ambient light may be partially coupled into waveguide structure 1130 by input coupler 1132 and coupled out of waveguide structure 1130 by output coupler 1136 towards focusing element 1140 and image sensor 1150. As such, the disparity camera may also capture images of the ambient environment. The captured images of the ambient environment may be sent to the controller, which may determine the brightness or intensity of the ambient light and generate appropriate control signals to control the dimming of active dimming layer 1160.

Second pupil-replicating waveguide display 1120 may be similar to first pupil-replicating waveguide display 1110 described above, and may include a projector (not shown), a waveguide display, and an active dimming layer 1162. The projector may be similar to the projector 1010 described above. The waveguide display may include a waveguide 1122 (e.g., a substrate transparent to visible light), an input coupler 1124 for couple display light and/or disparity test light into waveguide 1122, one or more output couplers 1126 configured to couple portions of the display light out of waveguide 1122 to an eyebox for the right eye of the user, and one or more disparity couplers 1128 configured to couple the disparity test light out of waveguide 1122. The disparity test light coupled out of waveguide 1122 may be coupled into waveguide structure 1130 by an input coupler 1134 and coupled out of waveguide structure 1130 by output coupler 1136 towards focusing element 1140 and image sensor 1150. Input coupler 1124, output couplers 1126, disparity couplers 1128, and input coupler 1132 may include, for example, holographic gratings, surface-relief gratings, transflective mirrors, polarization volume gratings, and the like.

Active dimming layer 1162 may be on a side of waveguide 1122 opposing the user's eye. There may be an air gap (e.g., formed by a spacer) between active dimming layer 1162 and waveguide 1122 so that the light coupled into waveguide 1122 may be reflected at the interface between waveguide 1122 and air through total internal reflection. Active dimming layer 1162 may be similar to active dimming layer 1160. Active dimming layer 1162 may be controlled by a controller to change the attenuation of the ambient light (e.g., sunlight) by active dimming layer 1162. Ambient light passed through active dimming layer 1162 may be combined with the display light by waveguide 1122, so that the ambient light may be superimposed on the display light to form augmented reality or mixed reality images. Ambient light passed through waveguide 1122 may be partially coupled into waveguide structure 1130. In some examples, ambient light passed through active dimming layer 1162 may be partially coupled into and guided by waveguide 1122 towards disparity couplers 1128, which may couple the ambient light out of waveguide 1122 towards waveguide structure 1130. The ambient light may be partially coupled into waveguide structure 1130 by input coupler 1134 and coupled out of waveguide structure 1130 by output coupler 1136 towards focusing element 1140 and image sensor 1150. As such, the disparity camera may also capture images of the ambient environment. The captured images of the ambient environment may be sent to the controller, which may determine the brightness or intensity of the ambient light and generate appropriate control signals to control the dimming of active dimming layer 1162.

The display light (and/or disparity test light) and ambient light coupled out of second pupil-replicating waveguide display 1120 and waveguide structure 1130 and the display light (and/or disparity test light) and ambient light coupled out of first pupil-replicating waveguide display 1110 and waveguide structure 1130 may be focused by focusing element 1140 to form an image on image sensor 1150. The relative position of the disparity test light patterns (or the displayed images) from first pupil-replicating waveguide display 1110 and second pupil-replicating waveguide display 1120 may indicate a tilt angle or other misalignment or relative movement of first pupil-replicating waveguide display 1110 with respect to second pupil-replicating waveguide display 1120. When a relative tilt, shift, or another misalignment is detected, the display image generated by the left projector and/or the displayed image generated by the right projector may be digitally adjusted to compensate the relative tilt, shift, or another misalignment. In addition, the difference in the intensity and/or color of the displayed images (or the disparity test light patterns) from first pupil-replicating waveguide display 1110 and second pupil-replicating waveguide display 1120 may be determined based on the image captured by the disparity camera, and may be used to control the projectors to compensate the difference. Furthermore, images of the ambient environment may also be captured and used for determining the brightness of regions of the ambient environment, thereby controlling the dimming of active dimming layers 1160 and 1162.

Figure 12:
FIG. 12 illustrates an example of an image captured by a disparity camera of a near-eye display system according to certain embodiments.

FIG. 12 illustrates an example of an image 1200 captured by a disparity camera of a near-eye display system (e.g., waveguide display system 900 or 1000, or near-eye display system 1100) according to certain embodiments. Image 1200 includes an image of the ambient environment (e.g., a parking lot), which may include bright and dark regions. Image 1200 also includes a displayed image (or a disparity test light pattern) that includes a two-dimensional array of dots 1210. Since the image captured by the disparity camera includes both the image of the ambient environment and the displayed image, the relative position of the displayed image with respect to the bright areas of the ambient environment viewed by the user's eye can be determined without having to transform or align the image of the ambient environment and the displayed image. By temporally offsetting or aligning the exposure periods of the disparity camera with respect to the display exposure periods (e.g., the periods that the projector is turned on), the disparity camera may capture images that include images of the ambient environment only but not the displayed images, or images that include both the images of the ambient environment and the displayed images (or the disparity test light patterns). Based on the brightness of the regions of the ambient environment that may overlap with the displayed images in the images captured by the disparity camera, an appropriate control signal (e.g., regional or global active dimming control voltage level) may be generated to control the dimming of the active dimming layer such that the bright areas of the ambient environment viewed by the user may be dimmed to a brightness level comparable with the brightness level of the displayed image, thereby improving the user experience of viewing the displayed images and reducing the overall power consumption of the near-eye display system.

FIG. 13 includes a flowchart 1300 illustrating an example of a method of dynamically controlling active dimming layers of a near-eye display system according to certain embodiments. The operations described in flowchart 1300 are for illustration purposes only and are not intended to be limiting. In various implementations, modifications may be made to flowchart 1300 to add additional operations or to omit some operations. The operations described in flowchart 1300 may be performed by, for example, HMD device 200, near-eye display 300, near-eye display system 700, waveguide display system 900 (e.g., controller 950), waveguided display system 1000 (e.g., controller 1038), near-eye display system 1100, or electronic system 1400 described below.

Operations at block 1310 may include receiving, by a controller from a camera (e.g., a disparity camera) of a near-eye display system, one or more images including a displayed image and an image of an ambient environment seen through an active dimming layer and a waveguide display. In some examples, the one or more images may include a first image including the displayed image, and a second image including an image of the ambient environment seen through the active dimming layer and the waveguide display. In some other examples, an image from the camera may include the displayed image superimposed on the image of the ambient environment seen through the active dimming layer and the waveguide display. An example of such an image is shown in FIG. 12. In some examples, the displayed image may include an image to be displayed to the user, a disparity test light pattern including infrared light, or a disparity test light pattern displayed during a blink of the eye of the user. In some examples, the one or more images may include a displayed image for a first eye of the user of the near-eye display system and a displayed image for a second eye of the user of the near-eye display system. The image of the ambient environment may include bright regions and dark regions. The waveguide display may include one or more input couplers configured to couple the displayed image generated by the projector into a waveguide, and one or more output couplers configured to couple the displayed image out of the waveguide at one or more regions of the waveguide. At least one of the one or more output couplers may be at a peripheral region of the waveguide and may be configured to couple a replicated image of the displayed image out of the waveguide towards the camera.

Operations at block 1320 may include determining a brightness level of an area of the image of the ambient environment that overlaps the displayed image. For example, the controller may determine an average brightness level or a maximum brightness level of the area of the image of the ambient environment that may overlap the displayed image in the received one or more images. The brightness level of the area of the image of the ambient environment may have been attenuated by the active dimming layer.

Operations at block 1330 may include generating, based on the determined brightness level, a control signal to control a dimming level of the active dimming layer. The active dimming layer may include, for example, an electrochromic material, a photochromic material, a liquid crystal layer, or a material including suspended nano-scale particles. The active dimming layer may have a variable transparency or opacity that may be controlled by the voltage level applied to the active dimming layer. For example, when the brightness level of the area of the image of the ambient environment is high, the active dimming layer may be controlled to have a low transparency and a high attenuation such that the ambient light seen by the user's eye may have a brightness level comparable to the brightness level of the image displayed to the user's eye and thus the displayed image may have good quality (e.g., contrast) and may be easily viewable by the user.

Optional operations at block 1340 may include determining a disparity of the near-eye display based on the displayed image in the received one or more images. As described above, the misalignments in the near-eye display system may be determined based on the position and/or orientation of the displayed image (or the disparity test light pattern) in the one or more images. In some examples, the one or more images may include a displayed image for a first eye of the user of the near-eye display system and a displayed image for a second eye of the user of the near-eye display system. Due to, for example, misalignments of components of the waveguide display for the left eye and/or components of the waveguide display for the right eye, nonuniformity of the output power of the projector for the left eye and the projector for the right eye, nonuniformity of the optical efficiencies of the waveguide display for the left eye and the waveguide display for the right eye, the displayed image for the first eye and the displayed image for the second eye may be misaligned and/or may have different brightnesses.

Optional operations at block 1350 may include controlling at least one projector of the near-eye display system to compensate the disparity of the near-eye display. For example, the controller may control the output power level of the projector, the field of view of the image generated by the projector, or a combination thereof, such that the displayed image for the first eye and the displayed image for the second eye may be aligned and may have similar brightnesses.

Embodiments of the invention may include or be implemented in conjunction with an extended reality system. Extended reality is a form of reality that has been adjusted in some manner before presentation to a user, which may include, for example, a virtual reality (VR), an augmented reality (AR), a mixed reality (MR), a hybrid reality, or some combination and/or derivatives thereof. Extended reality content may include completely generated content or generated content combined with captured (e.g., real-world) content. The extended reality content may include video, audio, haptic feedback, or some combination thereof, and any of which may be presented in a single channel or in multiple channels (such as stereo video that produces a three-dimensional effect to the viewer). Additionally, in some embodiments, extended reality may also be associated with applications, products, accessories, services, or some combination thereof, that are used to, for example, create content in an extended reality and/or are otherwise used in (e.g., perform activities in) an extended reality. The extended reality system that provides the extended reality content may be implemented on various platforms, including a head-mounted display (HMD) connected to a host computer system, a standalone HMD, a mobile device or computing system, or any other hardware platform capable of providing extended reality content to one or more viewers.

Figure 14:
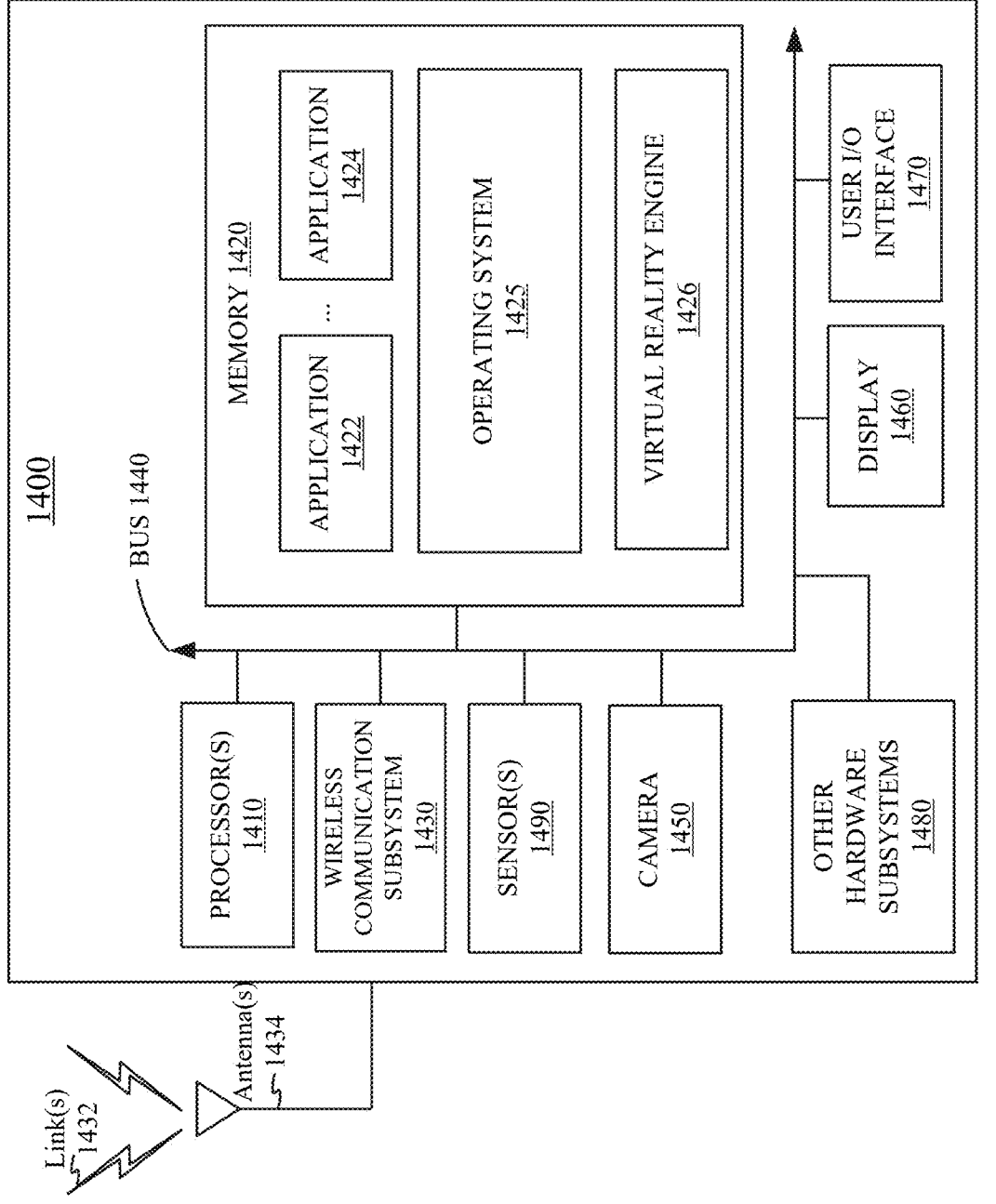
FIG. 14 is a simplified block diagram of an electronic system of an example of a near-eye display for implementing some of the examples disclosed herein.

FIG. 14 is a simplified block diagram of an example electronic system 1400 of an example near-eye display (e.g., HMD) device for implementing some of the examples disclosed herein. Electronic system 1400 may be used as the electronic system of an HMD device or other near-eye displays described above. In this example, electronic system 1400 may include one or more processor(s) 1410 and a memory 1420. Processor(s) 1410 may be configured to execute instructions for performing operations at a number of components, and can be, for example, a general-purpose processor or microprocessor suitable for implementation within a portable electronic device. Processor(s) 1410 may be communicatively coupled with a plurality of components within electronic system 1400. To realize this communicative coupling, processor(s) 1410 may communicate with the other illustrated components across a bus 1440. Bus 1440 may be any subsystem adapted to transfer data within electronic system 1400. Bus 1440 may include a plurality of computer buses and additional circuitry to transfer data.

Memory 1420 may be coupled to processor(s) 1410. In some embodiments, memory 1420 may offer both short-term and long-term storage and may be divided into several units. Memory 1420 may be volatile, such as static random access memory (SRAM) and/or dynamic random access memory (DRAM) and/or non-volatile, such as read-only memory (ROM), flash memory, and the like. Furthermore, memory 1420 may include removable storage devices, such as secure digital (SD) cards. Memory 1420 may provide storage of computer-readable instructions, data structures, program code, and other data for electronic system 1400. In some embodiments, memory 1420 may be distributed into different hardware subsystems. A set of instructions and/or code might be stored on memory 1420. The instructions might take the form of executable code that may be executable by electronic system 1400, and/or might take the form of source and/or installable code, which, upon compilation and/or installation on electronic system 1400 (e.g., using any of a variety of generally compilers, available installation programs, compression/decompression utilities, etc.), may take the form of executable code.

In some embodiments, memory 1420 may store a plurality of applications 1422 through 1424, which may include any number of applications. Examples of applications may include gaming applications, conferencing applications, video playback applications, or other suitable applications.

The applications may include a depth sensing function or eye tracking function. Applications 1422-1424 may include particular instructions to be executed by processor(s) 1410. In some embodiments, certain applications or parts of applications 1422-1424 may be executable by other hardware subsystems 1480. In certain embodiments, memory 1420 may additionally include secure memory, which may include additional security controls to prevent copying or other unauthorized access to secure information.

In some embodiments, memory 1420 may include an operating system 1425 loaded therein. Operating system 1425 may be operable to initiate the execution of the instructions provided by applications 1422-1424 and/or manage other hardware subsystems 1480 as well as interfaces with a wireless communication subsystem 1430 which may include one or more wireless transceivers. Operating system 1425 may be adapted to perform other operations across the components of electronic system 1400 including threading, resource management, data storage control and other similar functionality.

Wireless communication subsystem 1430 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1400 may include one or more antennas 1434 for wireless communication as part of wireless communication subsystem 1430 or as a separate component coupled to any portion of the system. Depending on desired functionality, wireless communication subsystem 1430 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1430 may permit data to be exchanged with a network, other computer systems, and/or any other devices described herein. Wireless communication subsystem 1430 may include a means for transmitting or receiving data, such as identifiers of HMD devices, position data, a geographic map, a heat map, photos, or videos, using antenna(s) 1434 and wireless link(s) 1432.

Embodiments of electronic system 1400 may also include one or more sensors 1490. Sensor(s) 1490 may include, for example, an image sensor, an accelerometer, a pressure sensor, a temperature sensor, a proximity sensor, a magnetometer, a gyroscope, an inertial sensor (e.g., a subsystem that combines an accelerometer and a gyroscope), an ambient light sensor, or any other similar devices or subsystems operable to provide sensory output and/or receive sensory input, such as a depth sensor or a position sensor. For example, in some implementations, sensor(s) 1490 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1400 may include a display 1460. Display 1460 may be a near-eye display, and may graphically present information, such as images, videos, and various instructions, from electronic system 1400 to a user. Such information may be derived from one or more applications 1422-1424, virtual reality engine 1426, one or more other hardware subsystems 1480, a combination thereof, or any other suitable means for resolving graphical content for the user (e.g., by operating system 1425). Display 1460 may use liquid crystal display (LCD) technology, light-emitting diode (LED) technology (including, for example, OLED, ILED, μLED, AMOLED, TOLED, etc.), light emitting polymer display (LPD) technology, or some other display technology.

Electronic system 1400 may include a user input/output interface 1470. User input/output interface 1470 may allow a user to send action requests to electronic system 1400. An action request may be a request to perform a particular action. For example, an action request may be to start or end an application or to perform a particular action within the application. User input/output interface 1470 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1400. In some embodiments, user input/output interface 1470 may provide haptic feedback to the user in accordance with instructions received from electronic system 1400. For example, the haptic feedback may be provided when an action request is received or has been performed.

Electronic system 1400 may include a camera 1450 that may be used to take photos or videos of a user, for example, for tracking the user's eye position. Camera 1450 may also be used to take photos or videos of the environment, for example, for VR, AR, or MR applications. Camera 1450 may include, for example, a complementary metal-oxide-semiconductor (CMOS) image sensor with a few millions or tens of millions of pixels. In some implementations, camera 1450 may include two or more cameras that may be used to capture 3-D images.

In some embodiments, electronic system 1400 may include a plurality of other hardware subsystems 1480. Each of other hardware subsystems 1480 may be a physical subsystem within electronic system 1400. While each of other hardware subsystems 1480 may be permanently configured as a structure, some of other hardware subsystems 1480 may be temporarily configured to perform specific functions or temporarily activated. Examples of other hardware subsystems 1480 may include, for example, an audio output and/or input interface (e.g., a microphone or speaker), a near field communication (NFC) device, a rechargeable battery, a battery management system, a wired/wireless battery charging system, etc. In some embodiments, one or more functions of other hardware subsystems 1480 may be implemented in software.

In some embodiments, memory 1420 of electronic system 1400 may also store a virtual reality engine 1426. Virtual reality engine 1426 may execute applications within electronic system 1400 and receive position information, acceleration information, velocity information, predicted future positions, or some combination thereof of the HMD device from the various sensors. In some embodiments, the information received by virtual reality engine 1426 may be used for producing a signal (e.g., display instructions) to display 1460. For example, if the received information indicates that the user has looked to the left, virtual reality engine 1426 may generate content for the HMD device that mirrors the user's movement in a virtual environment. Additionally, virtual reality engine 1426 may perform an action within an application in response to an action request received from user input/output interface 1470 and provide feedback to the user. The provided feedback may be visual, audible, or haptic feedback. In some implementations, processor(s) 1410 may include one or more GPUs that may execute virtual reality engine 1426.

In various implementations, the above-described hardware and subsystems may be implemented on a single device or on multiple devices that can communicate with one another using wired or wireless connections. For example, in some implementations, some components or subsystems, such as GPUs, virtual reality engine 1426, and applications (e.g., tracking application), may be implemented on a console separate from the head-mounted display device. In some implementations, one console may be connected to or support more than one HMD.

In alternative configurations, different and/or additional components may be included in electronic system 1400. Similarly, functionality of one or more of the components can be distributed among the components in a manner different from the manner described above. For example, in some embodiments, electronic system 1400 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, a RAM, a programmable read-only memory (PROM), an erasable programmable read-only memory (EPROM), an Electronically Erasable Programmable Read-Only Memory (EEPROM), a FLASH-EPROM, any other memory chip or cartridge, a Solid State Drive (SSD), or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those skilled in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, ACC, AABBCCC, or the like.

In this description, the recitation "based on" means "based at least in part on." Therefore, if X is based on Y, then X may be a function of at least a part of Y and any number of other factors. If an action X is "based on" Y, then the action X may be based at least in part on at least a part of Y.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A near-eye display system comprising:
a projector configured to generate a displayed image;
a waveguide display configured to replicate the displayed image, the waveguide display including an output coupler configured to couple a replicated image of the displayed image out of a peripheral region of a waveguide of the waveguide display;
an active dimming layer on a side of the waveguide opposing an eye of a user of the near-eye display system, the active dimming layer configurable to attenuate ambient light in response to a control signal;
a camera configured to receive both the replicated image of the displayed image and an image of an ambient environment see through the active dimming layer and the waveguide; and a controller configured to control the projector and the active dimming layer based on the replicated image of the displayed image and the image of the ambient environment from the camera.

2. The near-eye display system of claim 1, wherein the controller is configured to turn on or off the projector such that an image captured by the camera includes the image of the ambient environment but not the replicated image of the displayed image, or both the replicated image of the displayed image and the image of the ambient environment.

3. The near-eye display system of claim 1, wherein the controller is configured to control the active dimming layer based on a brightness level of an area of the image of the ambient environment that overlaps the replicated image of the displayed image.

4. The near-eye display system of claim 1, wherein the waveguide display includes:
one or more input couplers configured to couple the displayed image generated by the projector into the waveguide; and
one or more output couplers configured to couple replicated images of the displayed image out of the waveguide at a plurality of regions of the waveguide.

5. The near-eye display system of claim 4, wherein the one or more input couplers and the one or more output couplers include a surface-relief grating, a holographic grating, a polarization volume hologram, a transflective mirror, or a combination thereof.

6. The near-eye display system of claim 1, wherein the active dimming layer includes an electrochromic material, a photochromic material, a liquid crystal layer, or a material including suspended nano-scale particles.

7. The near-eye display system of claim 1, wherein the projector includes collimation optics configured to collimate the displayed image.

8. The near-eye display system of claim 1, wherein the displayed image includes:
an image to be displayed to the user;
a disparity test light pattern including infrared light;
a disparity test light pattern displayed during a blinking of the eye of the user; or
a combination thereof.

9. The near-eye display system of claim 1, further comprising:
a second projector configured to generate a second displayed image;
a second waveguide display configured to replicate the second displayed image, the second waveguide display including a second output coupler configured to couple a replicated image of the second displayed image out of a peripheral region of a second waveguide of the second waveguide display;
a second active dimming layer on a side of the second waveguide opposing a second eye of the user of the near-eye display system, the second active dimming layer configurable to attenuate the ambient light in response to a second control signal; and
an optical combiner configured to direct the replicated image of the displayed image, the replicated image of the second displayed image, the ambient light attenuated by the active dimming layer, and the ambient light attenuated by the second active dimming layer towards the camera.

10. The near-eye display system of claim 9, wherein the optical combiner includes a third waveguide and a plurality of optical couplers formed on or in the third waveguide.

11. The near-eye display system of claim 9, wherein the optical combiner includes a plurality of reflectors.

12. The near-eye display system of claim 1, wherein:

the near-eye display system is in a form of a pair of glasses; and the projector is positioned on or in a temple of the pair of glasses.

13. The near-eye display system of claim 1, wherein the waveguide display is configured to replicate the displayed image along two dimensions.

14. A near-eye display system comprising:

a first waveguide display subsystem including:

a first projector configured to generate a first displayed image;

a first waveguide display configured to replicate the first displayed image, the first waveguide display including a first output coupler configured to couple a replicated image of the first displayed image out of a peripheral region of a first waveguide of the first waveguide display; and a first active dimming layer on a side of the first waveguide opposing a first eye of a user of the near-eye display system, the first active dimming layer configurable to variably attenuate ambient light;

a second waveguide display subsystem including:

a second projector configured to generate a second displayed image;

a second waveguide display configured to replicate the second displayed image, the second waveguide display including a second output coupler configured to couple a replicated image of the second displayed image out of a peripheral region of a second waveguide of the second waveguide display; and a second active dimming layer on a side of the second waveguide opposing a second eye of the user of the near-eye display system, the second active dimming layer configurable to variably attenuate the ambient light;

a camera configured to receive at least the replicated image of the first displayed image and an image of an ambient environment see through the first active dimming layer and the first waveguide; and a controller configured to control at least the first projector and the first active dimming layer based on the replicated image of the first displayed image and the image of the ambient environment.

15. The near-eye display system of claim 14, further comprising an optical combiner configured to direct the replicated image of the first displayed image, the replicated image of the second displayed image, the ambient light attenuated by the first active dimming layer, and the ambient light attenuated by the second active dimming layer towards the camera, wherein the camera is further configured to receive both the replicated image of the second displayed image and an image of the ambient environment seen through the second active dimming layer and the second waveguide.

16. The near-eye display system of claim 14, wherein the controller is configured to turn on or off the first projector such that an image captured by the camera includes the image of the ambient environment seen through the first active dimming layer but not the replicated image of the first displayed image, or both the replicated image of the first displayed image and the image of the ambient environment seen through the first active dimming layer.

17. The near-eye display system of claim 14, wherein the controller is configured to control the first active dimming layer based on a brightness level of an area of the image of the ambient environment that overlaps the replicated image of the first displayed image.

18. The near-eye display system of claim 14, wherein the first displayed image includes:

an image to be displayed to the user;

a disparity test light pattern including infrared light;

a disparity test light pattern displayed during a blinking of the first eye of the user; or a combination thereof.

19. A method comprising, by a controller of a near-eye display system:

receiving, from at least one disparity camera of the near-eye display system, one or more images including a displayed image and an image of an ambient environment seen through an active dimming layer;

determining a brightness level of an area of the image of ambient environment that overlaps the displayed image; and generating, based on the determined brightness level, a control signal to control a dimming level of the active dimming layer.

20. The method of claim 19, further comprising:

determining a disparity of the near-eye display system based on the received one or more images; and controlling at least one projector of the near-eye display system to compensate the disparity of the near-eye display system.

\* \* \* \* \*